United States Patent [19]

Tsujioka

[11] Patent Number: 5,410,531
[45] Date of Patent: Apr. 25, 1995

[54] NOISE REDUCTION IN A MULTIPLEX RECORDED OPTICAL INFORMATION SYSTEM

[75] Inventor: Tsuyoshi Tsujioka, Osaka, Japan

[73] Assignee: Sanyo Electric Co., Ltd., Moriguchi, Japan

[21] Appl. No.: 111,313

[22] Filed: Aug. 2, 1993

Related U.S. Application Data

[63] Continuation of Ser. No. 856,741, Mar. 24, 1992, abandoned.

[30] Foreign Application Priority Data

| Mar. 28, 1991 | [JP] | Japan | 3-064798 |
| Jul. 25, 1991 | [JP] | Japan | 3-186368 |
| Aug. 19, 1991 | [JP] | Japan | 3-206988 |
| Aug. 19, 1991 | [JP] | Japan | 3-206989 |
| Jan. 9, 1992 | [JP] | Japan | 4-002247 |

[51] Int. Cl.[6] .............................. G11B 7/00
[52] U.S. Cl. ..................... 369/110; 369/107; 369/13; 369/288; 365/122
[58] Field of Search ............. 369/110, 13, 122, 100, 369/102, 107, 110, 124, 208; 365/120

[56] References Cited

U.S. PATENT DOCUMENTS

| 4,599,714 | 7/1986 | Endo | 369/110 |
| 4,682,311 | 7/1987 | Matsubayashi et al. | 369/110 |
| 4,691,308 | 9/1987 | Takagai et al. | 369/47 |
| 4,819,210 | 4/1989 | Miura et al. | 365/118 |
| 4,837,063 | 6/1989 | Irie | 369/288 |
| 4,841,510 | 6/1989 | Yoshigawa | 369/110 |
| 4,964,110 | 10/1990 | Harimai et al. | 369/110 |
| 5,007,021 | 4/1991 | Hattori | 365/122 |
| 5,088,086 | 2/1992 | Van et al. | 369/284 |
| 5,099,470 | 3/1992 | Masubayashi | 369/110 |
| 5,124,868 | 6/1992 | Matsubayashi et al. | 369/110 |
| 5,228,001 | 7/1993 | Birge et al. | 365/215 |

FOREIGN PATENT DOCUMENTS 61-203450 9/1986 Japan .

Primary Examiner—Georgia Y. Epps
Assistant Examiner—Kim-Kwok Chu
Attorney, Agent, or Firm—Armstrong, Westerman, Hattori, McLeland & Naughton

[57] ABSTRACT

A method of reproducing information recorded on an optical recording medium includes the steps of directing a first reading optical beam and a second reading optical beam onto a recording portion on the optical recording medium to obtain a first electric output signal corresponding to the first beam interacting with the optical recording medium and a second electric output signal corresponding to the second beam interacting with the optical recording medium, and performing a non-linear operation and a linear-operation by using these first and second output signals, thereby obtaining an improved reproduced output signal.

18 Claims, 38 Drawing Sheets

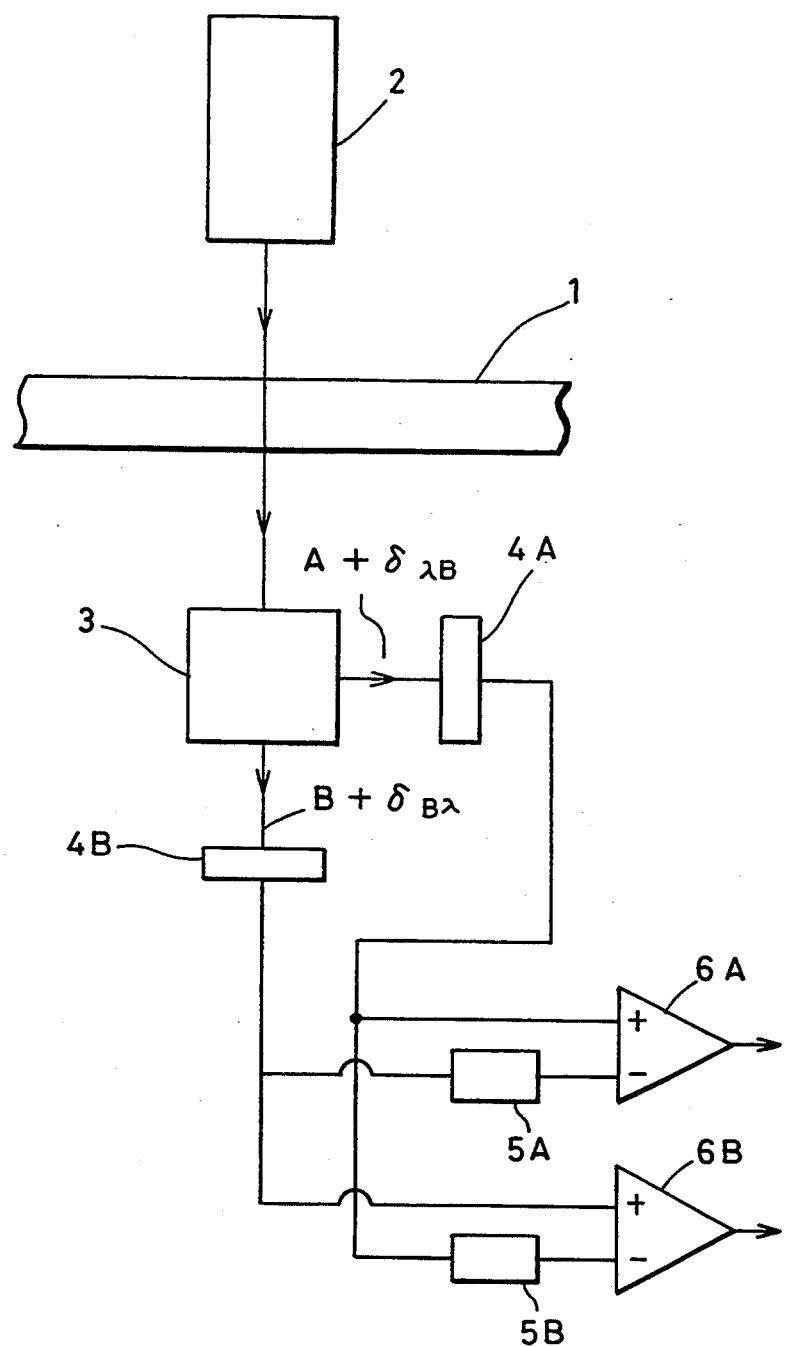

DATA : 0 1 1 0 0 0 1 0 1

FIG. 16
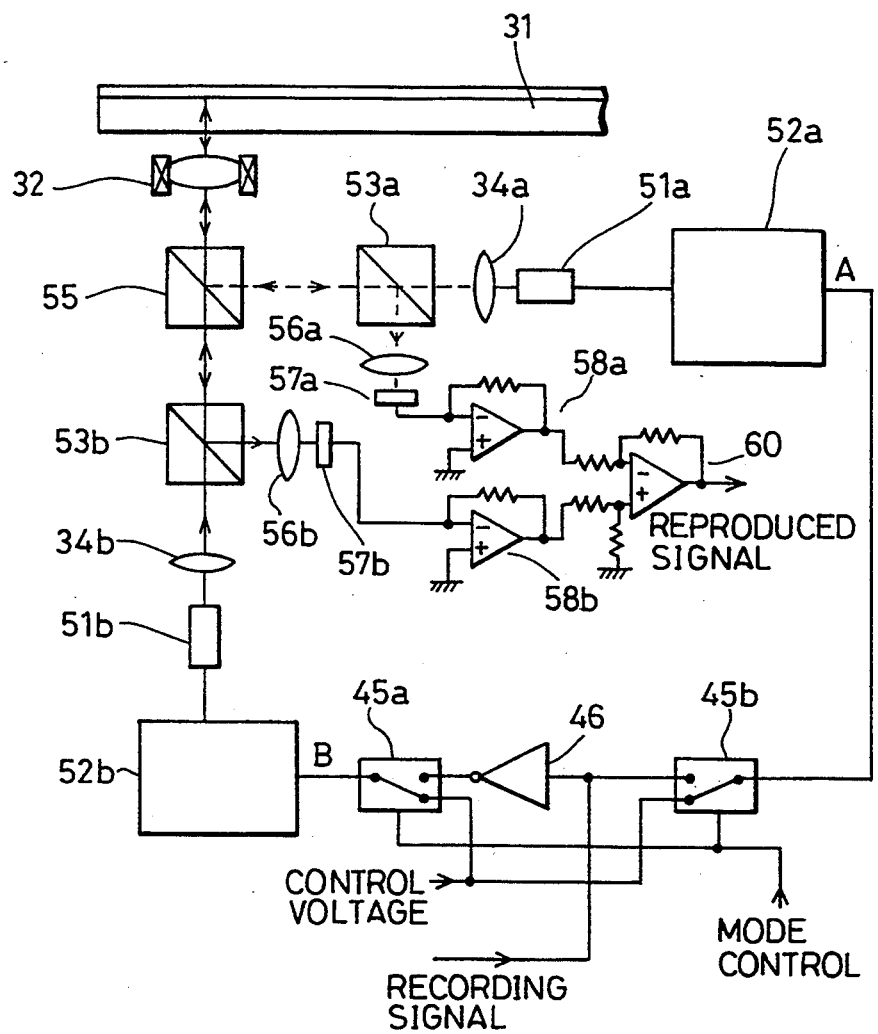
FIG. 17
RECORDING SIGNAL (A)
RECORDING SIGNAL (B)

INCIDENT LIGHT          REFLECTED LIGHT

INCIDENT LIGHT          REFLECTED LIGHT

— - - — ADVANCED PHASE AXIS

— - — RETARDED PHASE AXIS

INCIDENT LIGHT → REFLECTED LIGHT

INCIDENT LIGHT → REFLECTED LIGHT (40A x 40B)

(40A - 40C)

NOISE REDUCTION IN A MULTIPLEX RECORDED OPTICAL INFORMATION SYSTEM

This application is a continuation of application Ser. No. 07/856,741, filed Mar. 24, 1992, now abandoned.

BACKGROUND OF THE INVENTION

1. Field of the Invention

The present invention relates generally to a method of reproducing information on an optical recording medium, and more particularly, to a reduction of noise in a reproduced information signal and a reduction of crosstalk in multiplex recording/reproducing.

2. Description of the Background Art

In recent years, research and development have been made on an optical recording technique enabling high density recording. Such optical recording technique employs various disks such as a reproduction only compact disk (CD), a video disk, an erasable magnet-optical disk and an optical disk using functional dye. Light output from a semiconductor laser device used as a light source for reproducing information on a commercially available optical recording medium at present, in particular, a semiconductor laser device oscillating in a single mode, inevitably includes mode hop noise and back-talk noise (hereinafter referred to as light source noise). A reproduced signal therefore includes light source noise, so that a carrier/noise (C/N) ratio of the reproduced signal is reduced to prevent highly reliable reading of information.

In order to solve such problem, a semiconductor laser device oscillating in a single mode employs a method of superimposing a high frequency of about 1GHz on a current for driving the laser device to bring the laser device into a multi-mode oscillation state. The method, requiring an oscillation circuit for generating a high frequency to be provided in proximity to the semiconductor laser device, leads an increase in size of the semiconductor laser device and a pick-up unit including an objective lens. In addition, a shield for covering the pick-up unit should be provided in order to prevent leakage of a high frequency.

Consideration is given to the use of a short wavelength laser device utilizing secondary harmonics generation (SHG). This does not allow the above-described method of interposing a high frequency on the drive current to reduce noise.

Meanwhile, search has been carried out in recent years on the use of a photochromic material in a recording layer of an optical recording medium. The photochromic material undergoes a photochemical reaction in response to irradiation by light having a predetermined wavelength, whereby its molecular structure is changed and optical characteristics such as light absorbance are changed accordingly. The photochromic material also has a property of restoring its original molecule structure by irradiation of a light having another predetermined wavelength. Such property is used for reproduction of information recorded on an optical recording medium including a photochromic material, wherein the optical recording medium is irradiated with a laser beam for reproduction with low power, and an absorbance is changed in response to a photochemical reaction following a photochemical reaction at the time of recording is detected as a reflectance change.

Since no perfect surface smoothness can be obtained of a recording medium in a process of manufacturing the same (at the time of forming grooves, for example), such reproduction of information results in a reproduced signal including noise (hereinafter referred to as medium noise) due to surface non-smoothness of the optical medium, so that a reproduced signal of low noise (high C/N) cannot be obtained.

Japanese Patent Laying Open-No. 61-203450 discloses using the property of a photochromic material for multiplex recording (wavelength multiplex recording) of information on an optical recording medium including a plurality of photochromic materials having optical wavelength ranges for light absorption different from each other.

With reference to FIGS. 1A, 1B and 1C, there are shown light absorption characteristics of two kinds of photochromic materials (a) and (b) having their respective wavelength ranges for light absorption. In these diagrams, the abscissa represents a wavelength of light, while the ordinate represents a light absorbance. FIG. 1A shows the dependency of absorbance in the photochromic material (a) absorbance upon wavelength. The photochromic material (a) is changed by irradiation of a light having a predetermined wavelength to have the maximum absorbance at a wavelength of $\lambda_a$ and to have the maximum absorbance at $\lambda_a$ canceled by irradiation of a light having another predetermined wavelength. FIG. 1B shows the dependency of absorbance in the photochromic material (b) upon wavelength. The photochromic material (b) is similar to the material (a) but has a different maximum absorbance at wavelength $\lambda_b$ which is different from $\lambda_a$. FIG. 1C shows absorption characteristics of an optical recording medium including both of the photochromic materials (a) and (b). Such optical recording medium allows two-wavelength multiplex recording based on existence/no existence of maximum absorbances at wavelength $\lambda_a$ and $\lambda_b$.

However, since the photochromic material (b) generally absorbs a small amount of light even at wavelength $\lambda_a$, when information recorded in the photochromic material (a) by using a light having wavelength $\lambda_a$ is reproduced according to a light absorption change, information recorded in the photochromic material (b) is mixed in a reproduced signal (generation of crosstalk). This is also the case with reproduction, by using a light having wavelength of $\lambda_b$, of the information recorded in the photochromic material (b) by the light having wavelength $\lambda_b$.

Further known is a method of polarization multiplex recording by utilizing other material properties of a photochromic material. According to this method, information is recorded by irradiating an optical recording medium including uniformly distributed photochromic materials with a linearly polarized light for recording. The recorded portion has a large absorbance change with respect to a light having the same wavelength and the same polarization plane as those of the light for recording. On the other hand, the recorded portion has a small absorbance change with respect to a light having the same wavelength as that of the light for recording and having a polarization plane vertical to the polarization plane of said light. Duplex recording therefore can be made on the same portion of an optical recording medium by using linearly polarized lights orthogonal to each other.

This method, however, also causes cross-talk (polarization multiplex cross-talk) similar to that in the above-described wavelength multiplex recording. This is because a photochemical reaction is more likely to occur when transition moment that photochromic molecules have are in parallel with a polarization plane of a light, while a slight photochemical reaction occurs even when they are not in parallel with each other.

SUMMARY OF THE INVENTION

In view of the above-described problems in the prior art, an object of the present invention is to provide a method of reproducing a signal having a high quality with reduced light source noise, medium noise and cross-talk noise from an optical recording medium (hereinafter, the cross-talk is also included in a broad sense of the word "noise").

According to one aspect of the present invention, a method of reproducing information from an optical recording medium with a plurality of information multiplex-recorded at the same recording portion includes irradiating the optical recording medium with an optical beam for reading to cause an interaction between the reading optical beam and the optical recording medium, separating the reading optical beam including the plurality of information into a plurality of optical beams for reading corresponding to the plurality of information by the interaction, converting the plurality of reading optical beam into a plurality of electric reproduced signals, and removing, from an arbitrary one of the plurality of reproduced signals, a cross-talk noise component estimated based on at least one of the remaining reproduced signals.

According to another aspect of the present invention, a method of reproducing information from an optical recording medium, which information is recorded as a result of optical anisotrophy caused by polarized optical beam for writing, includes the steps of irradiating the optical recording medium with an optical beam for reading which beam is in a polarization state corresponding to the optical anisotrophy, separating the reading optical beam interacting with the optical recording medium into first and second reading optical beams having polarization components different from each other, and finding a difference between first and second electric output signals obtained by sensing the first and the second reading optical beams to reproduce information, thereby obtaining a reproduced output signal with reduced noise.

According to a further aspect of the present invention, a method of reproducing information recorded on an optical recording medium includes the steps of separating an optical beam emitted from a light source into first and second optical beams, obtaining a first electric output signal corresponding to an information signal read by irradiating the recording medium with the first optical beam, obtaining a second electric output signal corresponding to the second optical beam, and removing the second output signal from the first output signal, thereby obtaining a reproduced output signal with reduced light source noise.

According to still further aspect of the present invention, a method of reproducing information recorded on an optical recording medium includes the steps of irradiating the same recording portion on the optical recording medium with a first optical beam by which information can be read and a second optical beam by which information can not be substantially read to obtain a first electric output signal corresponding to the first beam interacting with the optical recording medium and a second electric output signal corresponding to the second beam interacting with the optical recording medium, and performing at least a linear operation out of non-linear operation and linear operation by using the first output signal and the second output signal, thereby obtaining a reproduced output signal with reduced noise.

According to still further aspect of the present invention, a method of reading an information signal recorded on an optical recording medium includes the steps of irradiating the same recording track on the optical medium with a plurality of optical beams to obtain a plurality of electric detected signals corresponding to the plurality of optical beams interacting with the optical recording medium, once storing each detected signal together with a synchronizing signal in a memory device, simultaneously reading the plurality of detected signals in response to the synchronizing signals and performing a predetermined operation by using the read detected signals, thereby obtaining a reproduced output signal with reduced noise.

According to still further aspect of the present invention, a method of reproducing information recorded on an optical recording medium includes the steps of irradiating different recording spots on the same recording track on the recording medium with a plurality of optical beams to obtain a plurality of detected signals corresponding to the plurality of optical beams interacting with the optical recording medium, compensating for a delay time depending on a distance between the spots on the recording track and a moving speed of these spots to make the phases of the plurality of detected signals coincide with each other, and performing a predetermined operation by using the plurality of detected signals having the same phase, thereby obtaining a reproduced output signal with reduced noise.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram illustrating the principle to be applied to an embodiment of the present invention.

FIG. 16 is a diagram showing one example of a recording/reproducing device capable of recording and reproducing information on and from an optical recording medium.

FIG. 17 is a waveform diagram showing a relationship between two information recording signals.

DESCRIPTION OF THE PREFERRED EMBODIMENT

First with reference to FIG. 2, the principle to be applied to the embodiments of the present invention will be described. In the figure, information A and B corresponding to the different states of two types of photochromic materials (a) and (b) are duplex-recorded at the same portion of an optical recording medium 1. A light source 2 for reading outputs an optical beam by which information recorded corresponding to the different states of the photochromic materials (a) and (b) can be read. The optical beam for reading, when being transmitted through the optical recording medium 1, interacts with the medium, thereby accepting the information A and B.

The reading optical beams including the information is separated into two optical beams by an optical separating means 3, which optical beams enter optical sensors 4A and 4B. The optical sensors 4A and 4B output reproduced signals, (main signal A+cross-talk component $\delta_{AB}$) and (main signal B+cross-talk component $\delta_{BA}$), respectively. Since the cross-talk component $\delta_{AB}$ is proportional to the main signal B and $\delta_{BA}$ to the main signal A, the reproduced signals are represented as $(A+P_{AB}\times B)$ and $(B+P_{BA}\times A)$, respectively. Since the cross-talk components are smaller than the main signals, each of $P_{AB}$ and $P_{BA}$ is a proportional constant smaller than 1.

Differential amplifier systems 6A and 6B respectively receive inversions of attenuated outputs of the optical sensors 4B and 4A so as to remove the cross-talk components from the reproduced signals. For example, one input terminal of the differential amplifier system 6A receives $(A+P_{AB}\times B)$ and the other input terminal receives an inversion of a signal obtained by multiplying $(B+P_{BA}\times A)$ by $P_{AB}$ by an attenuator 5A. The differential amplifier system 6A therefore outputs $(1-P_{AB}\times P_{BA})\times A$.

Similarly, the differential amplifier system 6B outputs $(1-P_{BA}\times P_{BA})\times B$. Since $P_{AB}$ and $P_{BA}$ are smaller than 1 at this time, $P_{AB}\times P_{BA}$ is so much smaller than 1 that it can be ignored. The differential amplifier systems 6A and 6B substantially output main signals A and B, respectively.

Figure 1A:
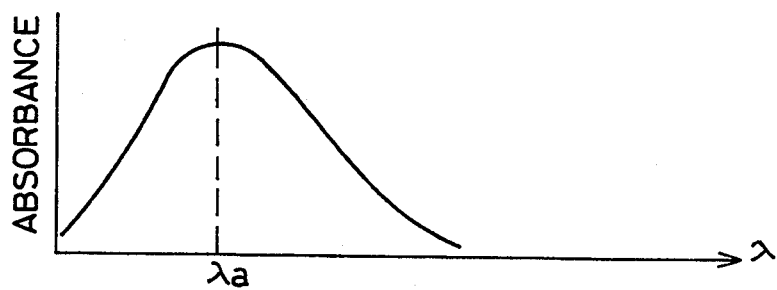
FIGS. 1A, 1B and 1C are graphs showing light absorption characteristics of a plurality of photochromic materials having respective wavelength ranges for light absorption.
Figure 1B:
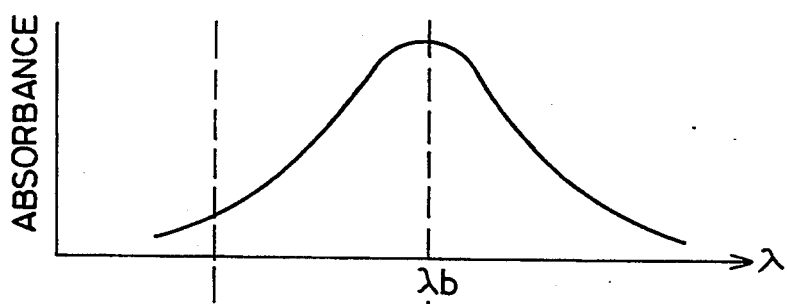
Figure 1C:
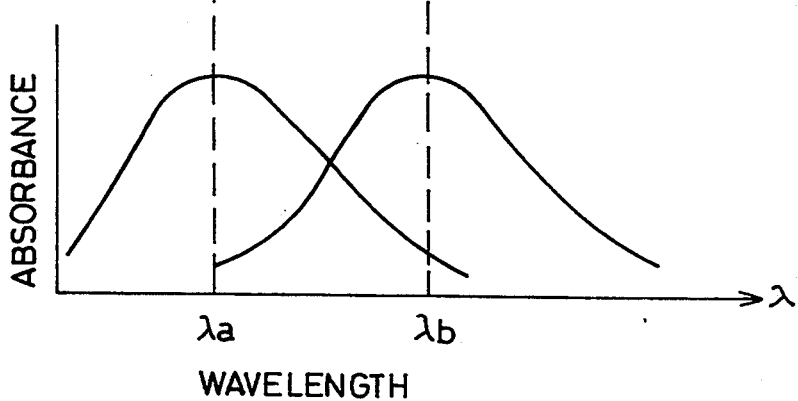
Figure 3:
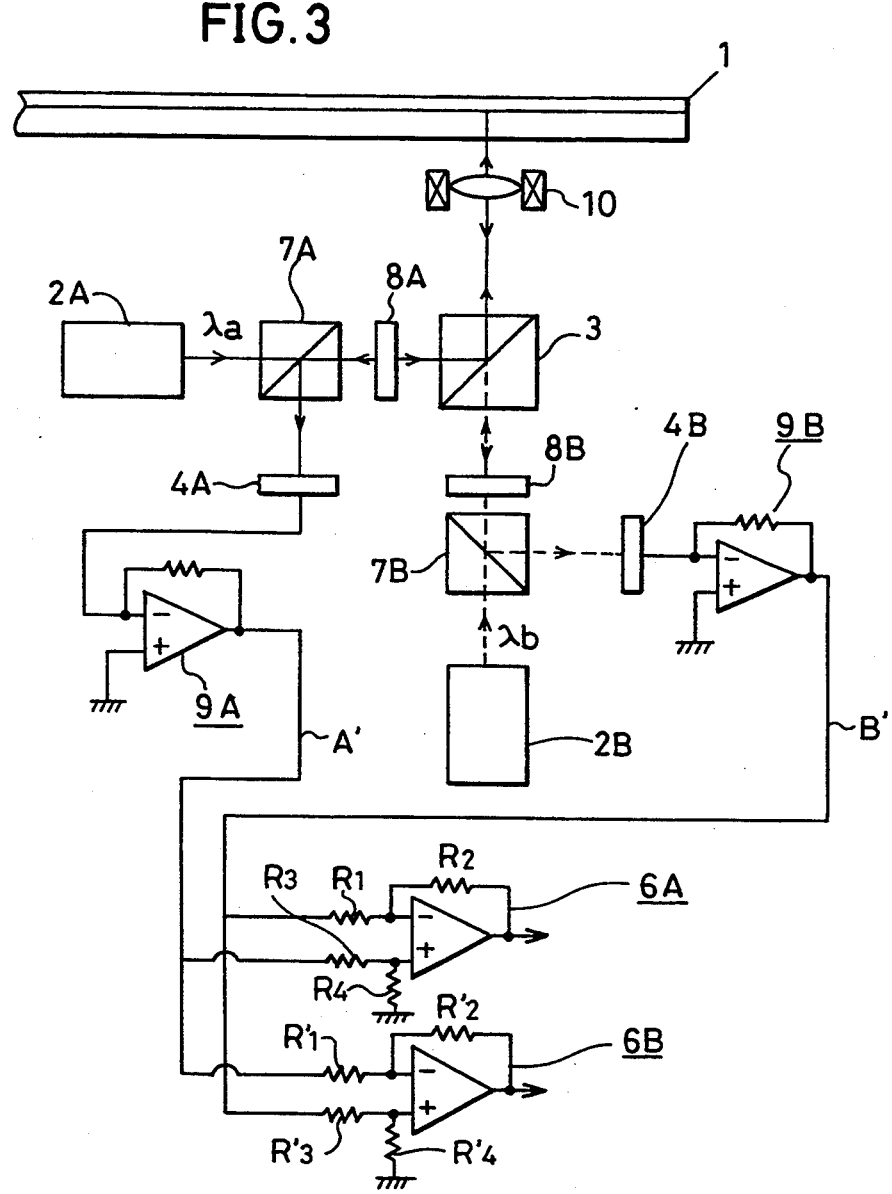
FIG. 3 is a diagram showing a reproducing device according to a first embodiment of the present invention.

FIG. 3 illustrates a reproducing device according to a first embodiment of the present invention. An optical recording medium 1 used in the first embodiment includes the same photochromic material as that of an optical recording medium on which conventional wavelength-multiplex-recording can be done. The optical recording medium 1 has a recording layer including a photochromic material (a) and a recording layer including a photochromic material (b) stacked on a substrate, on which a reflective layer is formed. Information is multiplex-recorded on the optical recording medium 1 depending on whether the medium has its maximum light absorbance at the wavelengths $\lambda_a$ and $\lambda_b$. It is therefore possible to reproduce information by detecting absorbance at the wavelengths $\lambda_a$ and $\lambda_b$.

A light source 2A outputs a linearly polarized laser beam with the wavelength of $\lambda_a$. The laser beam, after passing through a polarized beam splitter 7A as a P wave, is converted into a circularly polarized light by a ¼ wavelength plate 8A to enter a dichroic mirror 3. A light source 2B outputs a linearly polarized laser beam with the wavelength of $\lambda_b$. The laser beam, after passing through a polarized beam splitter 7B as a P wave, is similarly converted into a circularly polarized light by a ¼ wavelength plate 8B to enter the dichroic mirror 3.

The dichroic mirror 3 has a property of completely reflecting a light with the wavelength of $\lambda_a$ and allowing complete transmission of a light with the wavelength of $\lambda_b$. Therefore, the laser beam with the wavelength $\lambda_a$ and the laser beam with the wavelength $\lambda_b$ are combined into one beam by the dichroic mirror 3. The combined laser beam is focused on the optical recording medium 1 by an objective lens system 10 for two wavelengths.

The laser beam emitted onto the optical recording medium 1 is reflected by the reflective layer of the optical recording medium 1. The reflected optical beam modulated based on the information written in the recording layer of the optical recording medium 1 again passes through the objective lens system 10 in the reverse direction to enter the dichroic mirror 3. The light with the wavelength $\lambda_a$, out of the reflected light, is reflected by the dichroic mirror 3, while the light with the wavelength $\lambda_b$ is transmitted through the dichroic mirror 3.

The light with the wavelength $\lambda_a$ reflected by the dichroic mirror 3 is converted into a linearly polarized light by the ¼ wavelength plate 8A. Entering the polarized beam splitter 7A as a S wave, the linearly polarized light is reflected by the polarized beam splitter 7A to reach a photosensor 4A. The arriving light is converted into a current by the photosensor 4A and then converted into a signal voltage (reproduced signal) A' proportional to the current by a current/voltage converting unit 9A.

The light with the wavelength $\lambda_b$ having being transmitted through the dichroic mirror 3 is similarly converted into a linearly polarized light by the ¼ wavelength plate 8B. Entering the polarized beam splitter 7B as the S wave, the linearly polarized light is reflected by the polarized beam splitter 7B to reach a photosensor 4B. The arriving light is converted into a current by the photosensor 4B and then converted into a signal voltage (reproduced signal) B' proportional to the current by a current/voltage converting unit 9B.

Differential amplifier systems 6A and 6B operate to remove the above-described cross-talk components from the signal voltages A' and B', respectively. Resistors $R_1$-$R_4$ of the differential amplifier system 6A are therefore set to establish the relationships that $P_{AB}=R_3/R_1$; $R_2=R_3$; and $(1/R_1)+(1/R_2)=(1/R_3)+(1/R_4)$ in order to minimize an offset voltage. Similarly, resistors $R_1'$-$R_4'$ are set to establish $P_{BA}=R_3'/R_1'$; $R_2'=R_3'$; and $(1/R_1')+(1/R_2')=(1/R_3')+(1/R_4')$. Herein, the signal voltage A' includes the main signal A and the cross-talk component $\delta_{AB}$, while the signal voltage B' includes the main signal B and the cross-talk component $\delta_{BA}$, thereby establishing relationships of $P_{AB}=\delta_{AB}/B$ and $P_{BA}=\delta_{BA}/A$.

In other words, by appropriately setting values of resistors $R_1$-$R_4$ and $R_1'$-$R_4'$ as described above, the differential amplifier systems 6A and 6B are allowed to obtain outputs proportional to $(1-P_{AB} P_{BA})\times A \approx A$ and $(1-P_{AB}P_{BA})\times B \approx B$ without including a cross-talk component, respectively.

Figure 4:
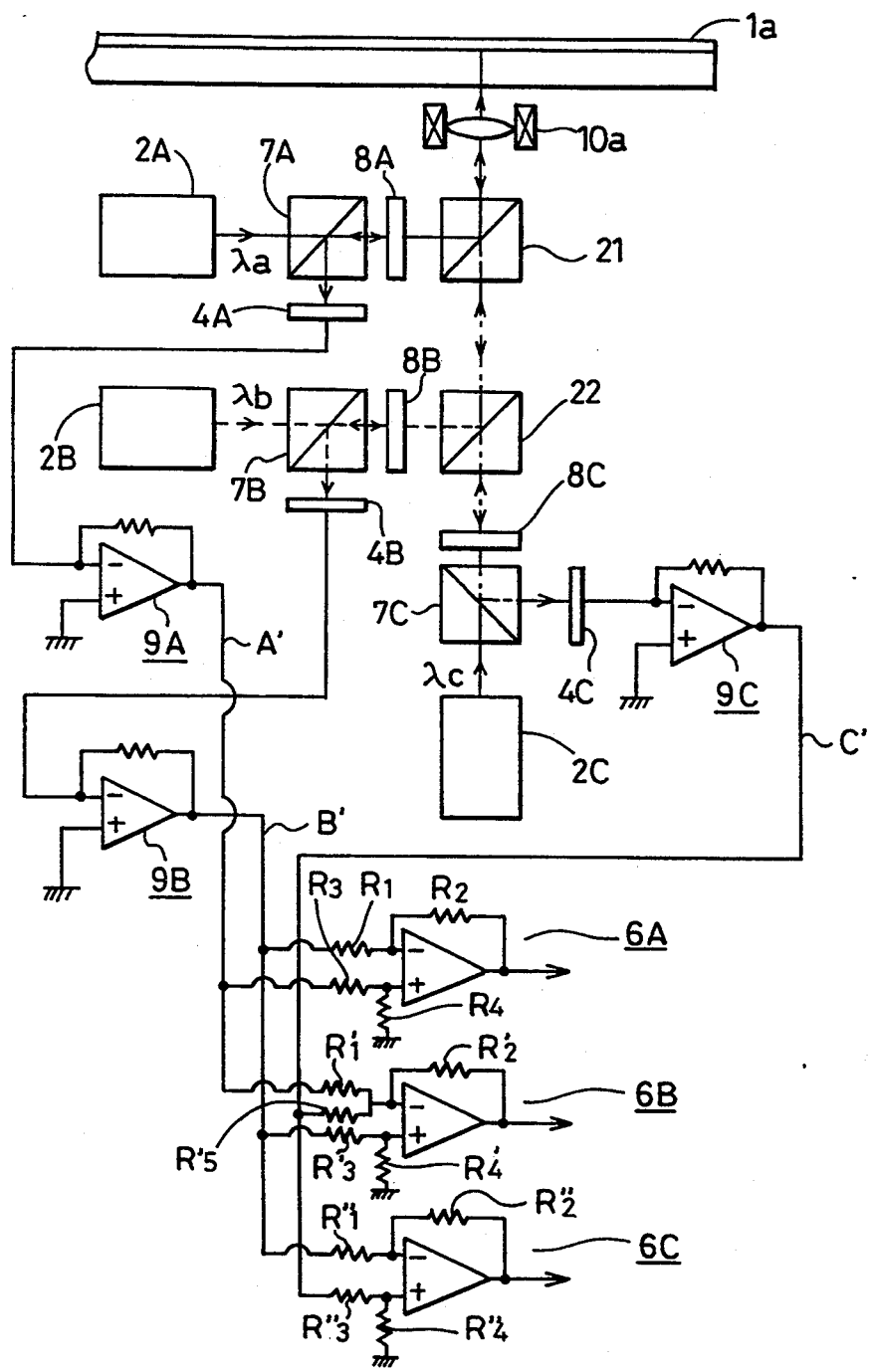
FIG. 4 is a diagram showing a reproducing device according to a second embodiment of the present invention.
Figure 5:
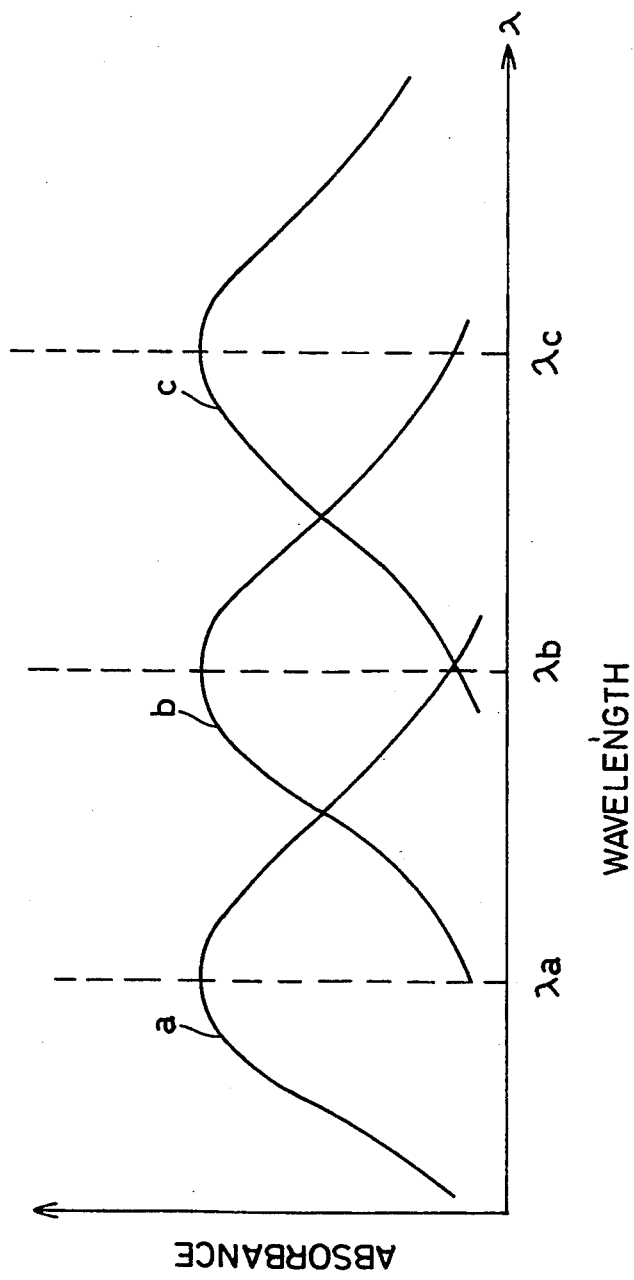
FIG. 5 is a graph showing light absorption characteristics of an optical recording medium including three kinds of photochromic materials.

FIG. 4 illustrates a reproducing device according to a second embodiment of the present invention, wherein portions corresponding to those in the embodiment of FIG. 3 are given the same reference numerals. An optical recording medium 1a used in the second embodiment may be of a reflection type like the optical recording medium according to the embodiment shown in FIG. 3. The optical recording medium 1a, however, includes three kinds of photochromic materials (a), (b) and (c), which materials are changed to have their maximum absorbances at wavelengths $\lambda_a$, $\lambda_b$ and $\lambda_c$ as shown in FIG. 5, respectively, by irradiation of lights with prescribed wavelengths and changed to lose the maximum absorbances by irradiation of lights with other prescribed wavelengths. That is, the optical recording medium 1a enables three-wavelength multiplex-recording and the absorption spectrum of the photochromic material (a) scarcely overlaps with that of the photochromic material (c). In other words, when the information recorded in the photochromic materials (a) and (c) are read, the read information include little cross-talk. However, the absorbances at the wavelengths $\lambda_a$ and $\lambda_c$ include some of the information recorded in the photochromic material (b) in addition to the information recorded in the photochromic materials (a) and (c), while the light absorbance at the wavelength $\lambda_b$ includes some of the information recorded in the photochromic materials (a) and (c).

In the device of FIG. 4, a light source 2A outputs a linearly polarized laser beam with a wavelength of $\lambda_a$. The laser beam is transmitted through a polarized beam splitter 7A as a P wave and then converted into a circularly polarized light by ¼ wavelength plate 8A to enter a dichroic mirror 21. A light source 2B outputs a linearly polarized laser beam with a wavelength $\lambda_b$. The laser beam, after passing through a polarized beam splitter 7B as the P wave, is converted into a circularly polarized light by a ¼ wavelength plate 8B to enter a dichroic mirror 22. A light source 2C outputs a linearly polarized laser beam with a wavelength $\lambda_c$. The laser beam, after passing through a polarized beam splitter 7C as the P wave, is converted into a circularly polarized light by a ¼ wavelength plate 8C to enter the dichroic mirror 22.

The dichroic mirror 22 has a property of completely reflecting a light with a wavelength $\lambda_b$ and allowing complete transmission of a light with a wavelength $\lambda_c$. The other dichroic mirror 21 has a property of completely reflecting a light with a wavelength $\lambda_a$ and allowing complete transmission of the light with the wavelengths $\lambda_b$ and $\lambda_c$. The three laser beams with the wavelengths $\lambda_a$, $\lambda_b$ and $\lambda_c$ are combined into one beam through dichroic mirrors 32 and 31. The combined laser beam is focused on the optical recording medium 1a by an objective lens system 10c for three wavelengths.

The laser beam emitted onto the optical recording medium 1a is reflected by a reflective layer of the optical recording medium 1a. The reflected beam which is modulated based on the information written in a recording layer of the optical recording medium 1a again passes through the optical lens system 10a in the reverse direction and then enters the dichroic mirror 21. The light with the wavelength $\lambda_a$, out of the reflected light, is reflected by the dichroic mirror 21, while the light with the wavelength $\lambda_b$ and the light with the wavelength $\lambda_c$ are transmitted through the dichroic mirror 21.

The light with $\lambda_a$ reflected by the dichroic mirror 21 is converted into a linearly polarized light by the $\frac{1}{4}$ wavelength plate 8A. Entering the polarized beam splitter 7A as the S wave, the linearly polarized light is reflected by the beam splitter to reach a photosensor 4A. The arriving light is converted into a current by the photosensor 4A and then converted into a signal voltage (reproduced signal) A' proportional to the current by a current/voltage converting unit 9A.

The light with $\lambda_b$ having been transmitted through the dichroic mirror 21 is completely reflected by the dichroic mirror 22 and then converted into a linearly polarized light by the $\frac{1}{4}$ wavelength plate 8B. Entering the polarized beam splitter 7B as the S wave, the linearly polarized light is reflected by the polarized beam splitter 7B to reach a photosensor 4B. The arriving light is converted into a current by the photosensor 4B and then converted into a signal voltage (reproduced signal) B' proportional to the current by a current/voltage converting unit 9B.

The light with $\lambda_c$ having been transmitted through the dichroic mirror 21 is also transmitted through the dichroic mirror 22 and then converted into a linearly polarized light by the $\frac{1}{4}$ wavelength plate 8C. Entering the polarized beam splitter 7C as the S wave, the linearly polarized light is reflected by the polarized beam splitter 7C to reach a photosensor 4C. The arriving light is converted into a current by the photosensor 4C and then converted into a signal voltage (reproduced signal) C' proportional to the current by a current/voltage converting unit 9C.

Differential amplifiers 6A, 6B and 6C operate to remove a cross-talk component between the information signals recorded in the photochromic materials (a) and (b) and a cross-talk component between information signal recorded in the photochromic materials (b) and (c). Resistors $R_1$–$R_4$ of the differential amplifier system 6A are therefore set to establish $P_{AB}=R_3/R_1$; $R_2=R_3$; and $(1/R_1)+(1/R_2)=(1/R_3)+(1/R_4)$ so as to minimize an offset voltage. Similarly, resistors $R_1'$–$R_5'$ of the differential amplifier system 6B are set to establish $P_{BA}= R_3'/R_1'$; $P_{BC}=R_3'/R_5'$; $R_2'=R_3'$; and $(1/R_1')+(1/R_2')+(1/R_5')=(1/R_3')+(1/R_4')$, while resistors $R_141$ –$R_4''$ of the differential amplifier system 6C are set to establish $P_{CB}=R_3''/R_1''$; $R_2''=R_3''$; and $(1/R_1')+(1/R_2'')+(1/R_3'')+(1/R_4'')$.

Herein, the signal voltage A' includes the main signal A and the cross-talk component $\delta_{AB}$. The signal voltage B' includes the main signal B and the cross-talk component $\delta_{BA}+\delta_{BC}$. The signal voltage C' includes the main signal C and the cross-talk component $\delta_{CB}$. Since the respective cross-talk components are proportional to the corresponding main signals, relationships are established which are $P_{AB}=\delta_{AB}/B$; $P_{AB}=\delta_{AB}/A$; $P_{BC}=\delta_{BC}/C$; and $P_{CB}=\delta_{CB}/B$.

As a result, by setting the above-described resistance values as described above, the differential amplifier systems 6A, 6B and 6C obtain outputs proportional to $(1-P_{AB}P_{BA})\times A \approx A$; $(1-P_{AB}P_{BA}-P_{BC}P_{CB})\times B \approx B$; and $(1-P_{BC}P_{CB})\times C \approx C$ without including cross-talk components, respectively.

Figure 6:
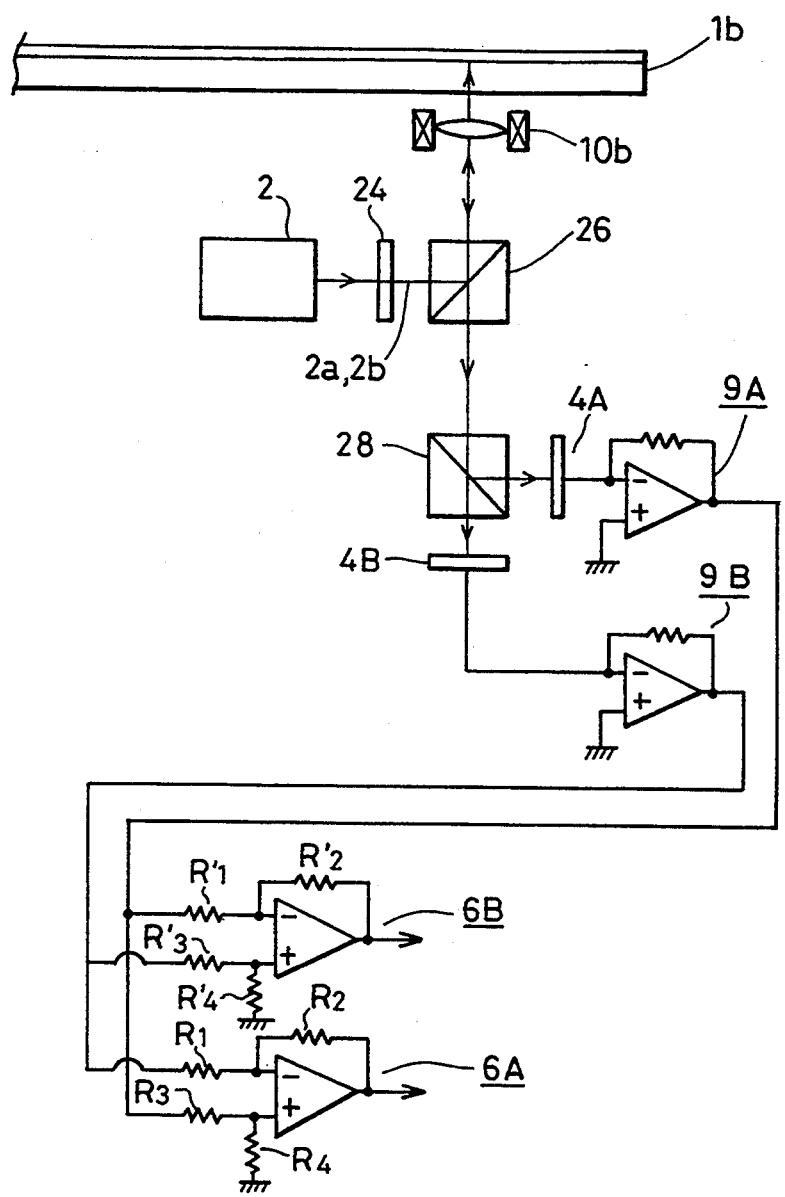
FIG. 6 is a diagram showing a reproducing device according to a third embodiment of the present invention.

FIG. 6 illustrates a reproducing device according to a third embodiment of the present invention. While the embodiments shown in FIGS. 3 and 4 use a wavelength multiplex recorded optical recording medium, the embodiment of FIG. 6 uses a polarization multiplex recorded optical recording medium, cross-talk of which is reduced at the time of reading information on the optical recording medium. For the third embodiment, a known polarization multiplex recording medium can be used as an optical recording medium 1b. More specifically, the optical recording medium 1b includes a recording layer formed to have one kind of photochromic material scattered with random orientations on a substrate and a reflective layer formed thereon. Information is written on the optical recording medium 1b by polarized lights 2a and 2b orthogonal to each other. Even with the two linearly polarized lights orthogonal to each other perfect selectivity, can not be obtained and thus cross-talk occurs at the time of reading the information. The optical recording medium 1b, when being irradiated with the linearly polarized light, photochemically reacts mainly along the polarization direction. In other words, the optical recording medium has its light absorbance changed (absorption is changed to be small in general) in the polarization direction in particular.

A circularly polarized light is regarded as two linearly polarized lights having the same amplitude and being orthogonal to each other. Therefore, when a portion at which information has been recorded by irradiation of two linearly polarized lights 2a and 2b orthogonal to each other, is irradiated in order to read the information with a circularly polarized light having the same wavelength as that used in recording the information, then the intensity of the circularly polarized light is modulated as a result of interaction with the recorded portion. In addition, at a portion in which information is recorded by radiation of a linearly polarized light, an elliptically polarized light is obtained from a circularly polarized light for reading. At a portion in which information is recorded by radiation of another linearly polarized light orthogonal to the polarization plane of the linearly polarized light, the circularly polarized light for reading becomes another elliptically polarized light having a major axis orthogonal to the major axis of said elliptically polarized light.

In the device of FIG. 6, a light source 2 outputs a laser beam for reproduction as a linearly polarized light. The output laser beam is converted into a circularly polarized light by a $\frac{1}{4}$ wavelength plate 24, which polarized light is then partly reflected by a half mirror 26 and focused on the optical recording medium 1b by an objective lens system 10b. The laser beam focused on the optical recording medium 1b is reflected by the reflective layer in the optical recording medium 1b to become a reflected light in a polarization state corresponding to the polarization multiplex recorded information.

The reflected light passes through the objective lens system 10b in the reverse direction, a part of which passes through the half mirror 26. The part of the light having passed through the half mirror 26 reaches a polarized beam splitter 28. With the orientation of the polarized beam splitter 28 set to achieve an ideal separation of the plurality of information polarization-multiplex-recorded on the optical recording medium 1b, the part of the light is separated into two linearly polarized lights corresponding to the lights 2a and 2b and being orthogonal to each other, which two linearly polarized lights reach sensors 4A and 4B, respectively. The arriving lights are converted into currents by the sensors 4A and 4B and then converted into voltages by current-/voltage converting units 9A and 9B, respectively.

In differential amplifier systems 6A and 6B, resistors $R_1$-$R_4$ and $R_1'$-$R_4'$ are similarly set to those in the embodiment of FIG. 3 to obtain reproduced outputs with cross-talk components removed therefrom.

While a reflection type optical recording medium is used in the above-described embodiment, a transmission type optical recording medium can be used in the same manner. In the optical recording media in the embodiments of FIGS. 3 and 4, a plurality of recording layers each including each of different kinds of photochromic materials may be stacked or a recording layer may include a plurality of photochromic materials. The optical recording medium in the embodiment of FIG. 6 may include a recording layer with a photochromic material oriented in one direction and a recording layer made of a photochromic material oriented in a direction orthogonal thereto.

It can be understood that the present invention is applicable to an optical recording medium allowing wavelength multiplex recording and polarization multiplex recording, in addition to the above-described optical recording medium.

Possible photochromic materials to be included in the optical recording medium according to the present invention include various materials of spiro-pyrane type, fulgide type, azobenzene type and diaryl ethene type.

Figure 7:
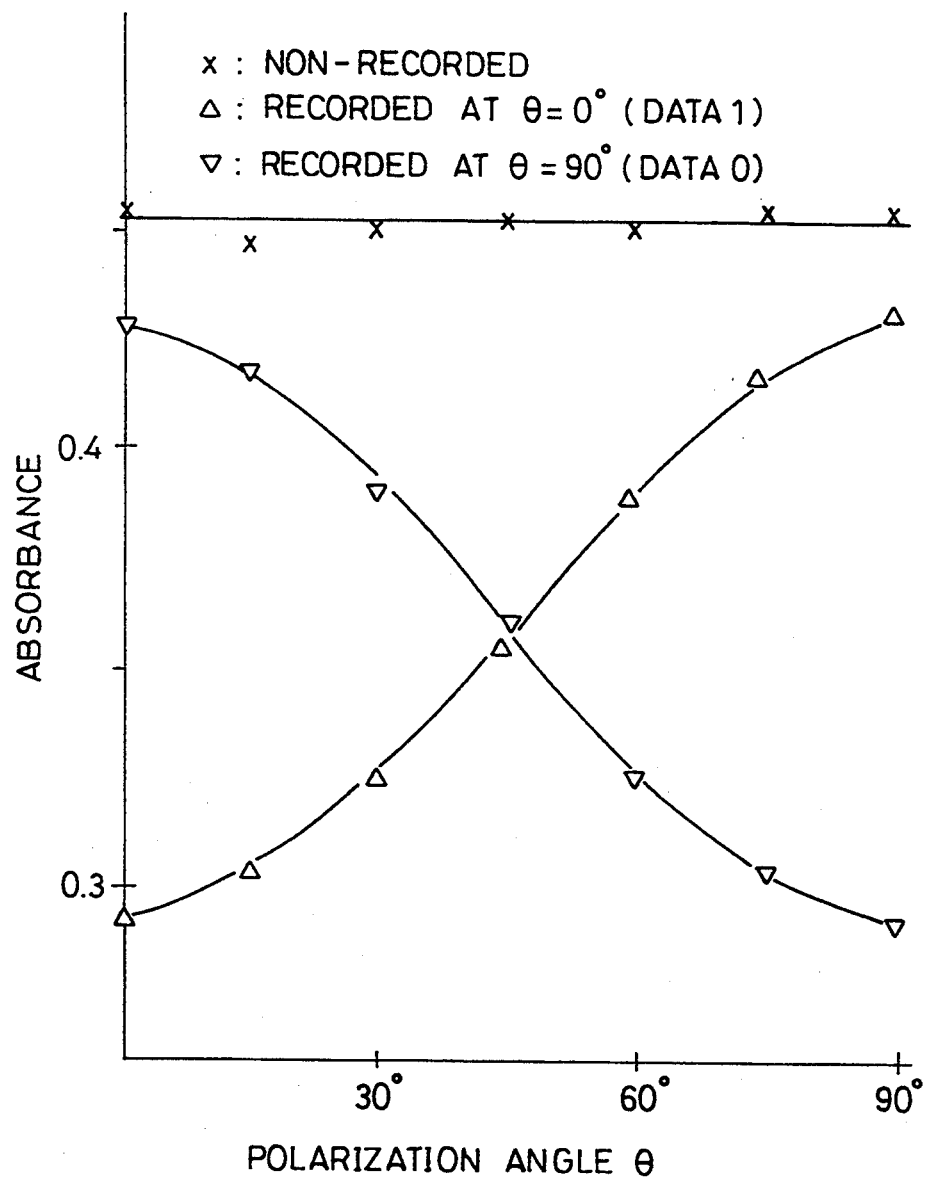
FIG. 7 is a graph showing the optical principle to be applied to a fourth embodiment.

FIG. 7 illustrates the optical principle to be applied to a fourth embodiment of the present invention. In the graph of FIG. 7, the abscissa represents an angle of a reference plane to a polarization plane and the ordinate represents light absorbance of a photochromic material. An optical recording medium having a recording layer including a photochromic material has its dichroism caused by irradiation of a linearly polarized light, for example. As a result, after irradiating the optical recording medium with a linearly polarized optical beam for writing, a measurement of a light absorbance of the recording medium with respect to a linearly polarized light having a polarization plane at angles with the polarization plane of the writing optical beam finds that the absorbance has polarization angle dependency (optical anisotrophy). It is therefore possible to record and reproduce information by utilizing such property of the photochromic material.

Information can be recorded, for example, by irradiating an optical recording medium with a linearly polarized light having a polarization plane of $\theta=0°$ corresponding to data 1 and with a linearly polarized light having a polarization plane of $\theta=90°$ corresponding to data 0. Herein, $\theta$ represents an angle of a reference plane to a polarization plane. For reproducing information, such phenomena is utilized that a circularly polarized light or a random polarized light for reading directed to an optical recording medium has its polarization state changed corresponding to recorded information.

FIG. 7 shows one example of light polarization characteristics of an optical recording medium. In the graph of FIG. 7, the abscissa represents a polarization angle $\theta$ and the ordinate represents a relative light absorbance. The line indicated by the marks × represent an absorbance in non-recorded state. The curve indicated by the marks △ represents a light absorbance in a state where information is recorded with an optical beam having a polarization angle of $\theta=0°$, while the curve indicated by the marks ▽ represents a light absorbance in a state where information is recorded with an optical beam having a polarization angle of $\theta=90°$.

Figure 8:
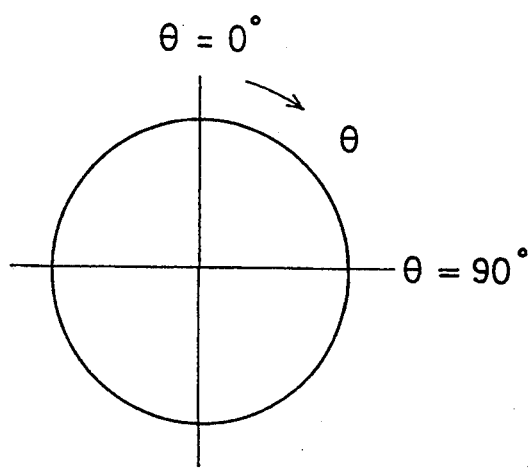
FIG. 8 is a graph showing an intensity distribution of a circularly polarized light.
Figure 9:
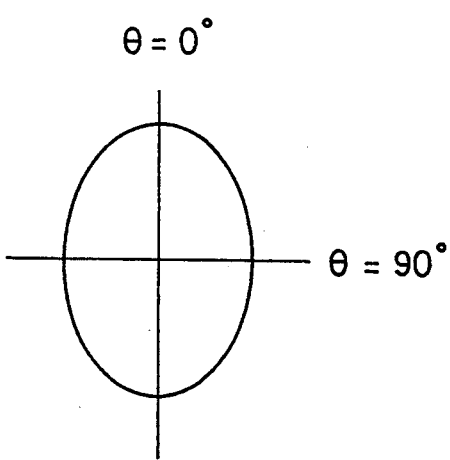
FIGS. 9 and 10 are graphs each showing an example of an intensity distribution-of an elliptically polarized light.
Figure 10:
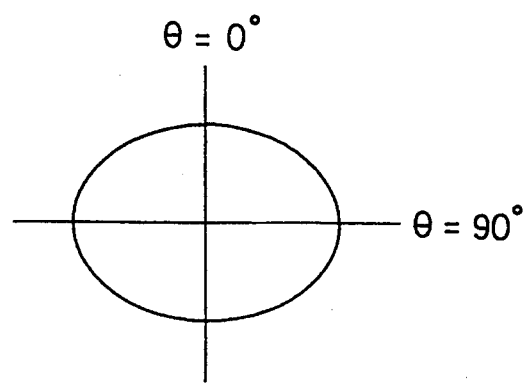

In a case of an optical recording medium with information recorded thereon to have the characteristics shown in FIG. 7, for example, an intensity of a polarization component of a reading light is large at $\theta=0°$ and the intensity of the polarization component is low at $\theta=90°$ for data 1, while the intensity of the polarization component is low at $\theta=0°$ and the same is high at $\theta=90°$ for data 0. When an optical recording medium is irradiated with a circularly polarized light for reading having the intensity distribution as shown in FIG. 8, for example, the reading light becomes an elliptically polarized light having the intensity distribution as shown in FIG. 9 for data 1, while the reading light becomes another elliptically polarized light having the intensity distribution as shown in FIG. 10 for data 0. A reproduced signal can be therefore obtained by separating a light into a polarization component at $\theta=0°$ and that at $\theta=90°$ by a polarized beam splitter or the like, detecting these separated polarization components and finding a difference between two output signals obtained by the detection.

Medium noise and light source noise are substantially uniformly included in any of polarization components of a reading light and are in the same phase. The medium noise and the light source noise can be therefore removed by finding a difference between an output based on a polarization component at $\theta=0°$ and an output based on a polarization component at $\theta=90°$ after matching amplitude levels of the noises in the two polarization components to each other through appropriate amplification and/or attenuation.

Figure 11:
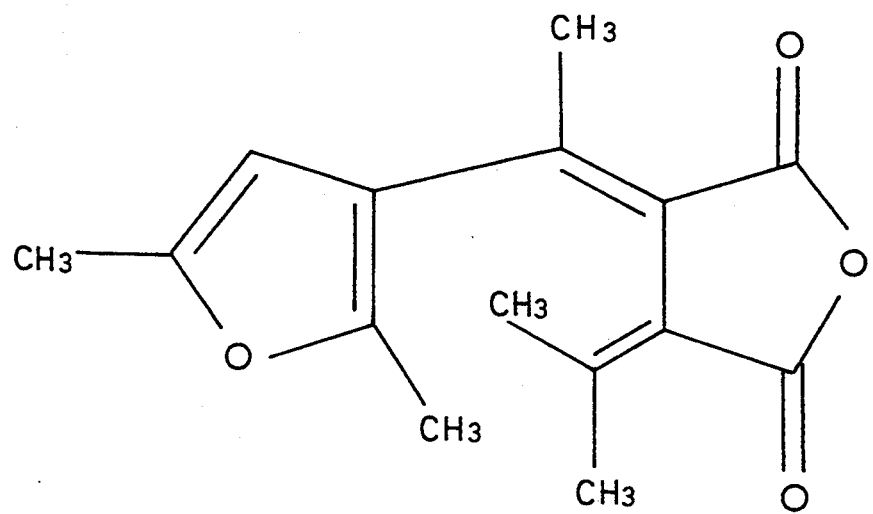
FIG. 11 is a diagram showing one example of a molecular structure of a photochromic material.

The following is a detailed description of the fourth embodiment. Various photochromic materials can be used as a material of a recording layer. For example, an optical recording medium can include a recording layer of 1 μm thick formed by spin-coating a solution of the photochromic material shown in FIG. 11 and polymethyl-methacrylate in methylene chloride on a quartz substrate and a reflective layer made of 100 Å thick aluminum formed by vacuum deposition on the recording layer. The optical recording medium undergoes a coloring reaction in response to an ultraviolet light and a decoloring reaction in response to a visible light (with a wavelength of 500 nm, for example).

Figure 12:
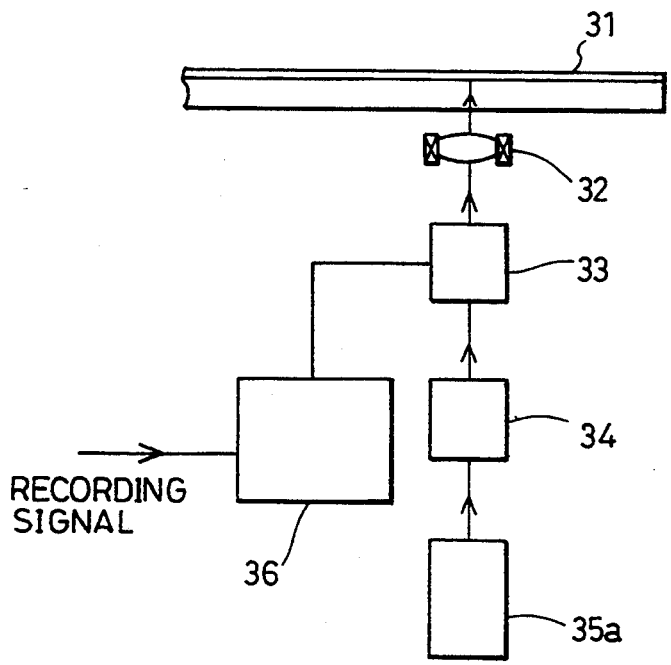
FIG. 12 is a diagram showing one example of an optical system for writing information on an optical recording medium.

FIG. 12 shows one example of an optical system for writing information on an optical recording medium. An optical recording medium 31 is colored with an ultraviolet light. A linearly polarized laser beam output from a light source 35a which is an Ar laser device capable of outputting a laser beam with a wavelength of 514.5 nm (intensity:10 mW), is shaped by an optical element 34 including a beam expander. Then, the shaped laser beam enters an optical element 33 for converting polarization state, which element serves to rotate a polarization plane of a linearly polarized light in response to an information recording signal.

The optical element 33 for converting polarization state includes a Faraday rotator or an electrooptical element. The Faraday rotator is capable of rotating a polarization plane by changing a current applied thereto, while the electrooptical element is capable of rotating a polarization plane by changing a voltage applied thereto.

The optical element 33 for converting polarization state is driven through a modulation circuit 36 in response to data "0" or "1" (information recording signal). The laser beam entering the optical element 33 for converting polarization state is rotated such that its polarization plane for data "0" is orthogonal to that for data "1" (such that the polarization plane has $\theta=0°$ in response to the data "1" and $\theta=90°$ for the data "0", for example), and then focused on a recording layer of the optical recording medium 31 by an objective length 32, thereby writing information.

In a case where a semiconductor laser device outputting a divergent light is used as the light source 35a, an optical beam shaping element 34 including a collimator lens can be used and where a gas laser device is used as the light source 35a, the optical element 34 including a beam expander may be used. Since the electrooptical element 33 is capable of converting a linearly polarized light into an elliptically polarized light or a circularly polarized light and vice versa, the element enables information recording utilizing other polarization states.

Figure 13:
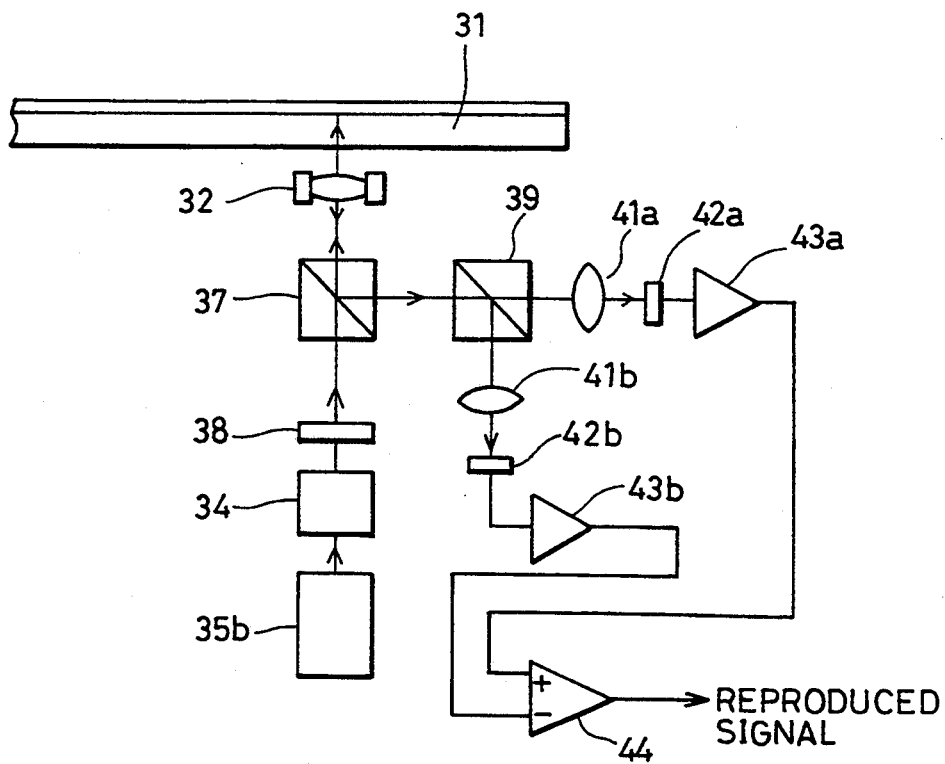
FIG. 13 is a diagram showing one example of a device for reproducing information recorded on an optical recording medium by the recording device of FIG. 12.

FIG. 13 shows one example of a reproducing device for reading information recorded by the recording device of FIG. 12 on an optical recording medium. The intensity of a reading optical beam output from a light source 35b for reproduction is set to be as small as possible. Used as the light source 35b for reproduction is, for example, an Ar laser device outputting a laser beam with a wavelength of 514.5 nm (intensity:0.5 mW, for example).

A linearly polarized reading laser beam output from the light source 35b is shaped by an optical beam shaping element 34 including a beam expander and then converted into a random polarized light by a polarization canceling plate 38. Thereafter, the reading beam is transmitted through a non-polarized beam splitter 37 having the same reflectance (or transmittance) for the P polarization and the S polarization and then focused on a recording layer of an optical recording medium 31 by an objective lens 32.

The laser beam focused on the recording layer has its intensity modulated so as to include two light polarization components of $\theta=0°$ and $\theta=90°$ corresponding to recorded information, which beam is reflected by the optical recording medium 31. The reflected light is modulated such that the intensity of a polarization component of $\theta=0°$ is high and the intensity of a polarization component of $\theta=90°$ is low in response to the data "1" and such that the intensity of a polarization component of $\theta=0°$ is low and that of a polarization component of $\theta=90°$ is high in response to the data "0".

The modulated reflected optical beam is transmitted through the objective lens 32 in a reverse direction and reflected by the non-polarized optical beam splitter 37 to enter a polarized beam splitter 39 with its orientation set to separate the polarization component of $\theta=0°$ and that of $\theta=90°$. For example, the polarization component of $\theta=0°$ is transmitted through the polarized beam splitter 39 and converged on a photodetector 42a by a lens 41a. An output current of the photodetector 42a is converted into a voltage by a current/voltage converting unit 43a. The polarization component of $\theta=90°$ is reflected by the polarized beam splitter 39 and converged on a photodetector 42b by a lens 41b. An output current of the photodetector 42b is converted into a voltage by a current/voltage converting unit 43b.

Figure 14A:
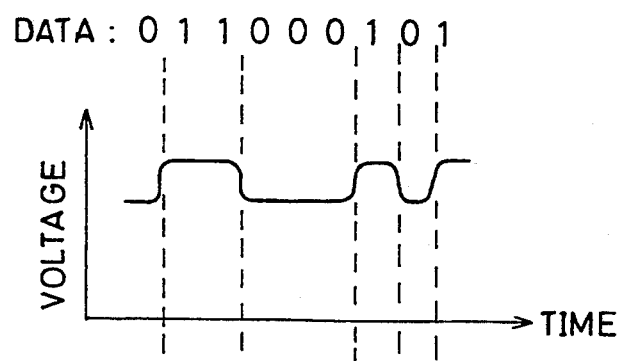
FIGS. 14A, 14B and 14C are diagrams showing an examples of output voltages-from a current/voltage converting unit and a differential amplifier in the reproducing device of FIG. 13.
Figure 14B:
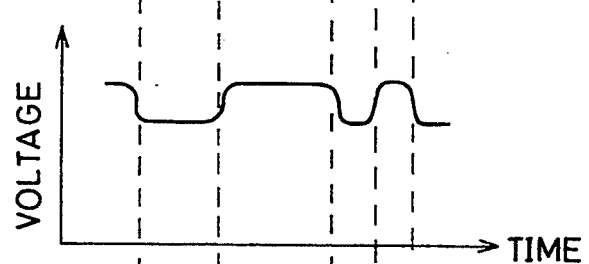
Figure 14C:
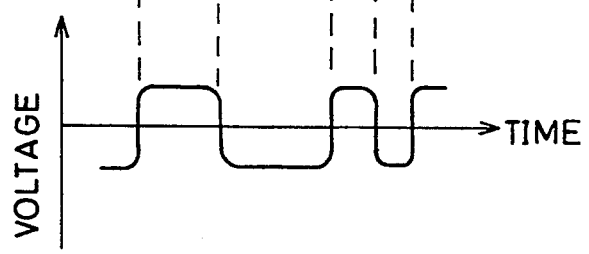

FIGS. 14A, 14B and 14C show examples of output voltages of the current/voltage converting units 43a and 43b and a differential amplifier 44. In this graph, the abscissa represents time and the ordinate represents a voltage. As can be seen from these graphs, two voltages respectively output from the current/voltage converting units 43a and 43b according to read data are in phases opposite to each other. Subtracting one from the other of these voltages by the differential amplifier 44 obtains such a reproduced voltage signal as shown in FIG. 14C.

Figure 15A:
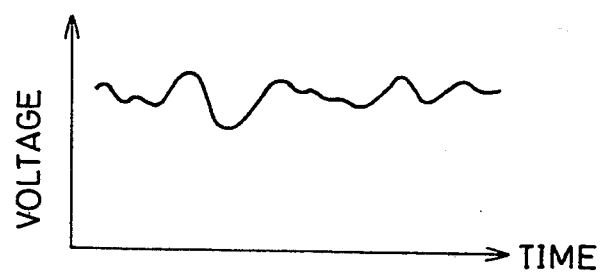
FIGS. 15A and 15B are graphs each showing a relationship between an amplitude and a phase of a noise component in an output voltage obtained from each of the two current/voltage converting units.
Figure 15B:
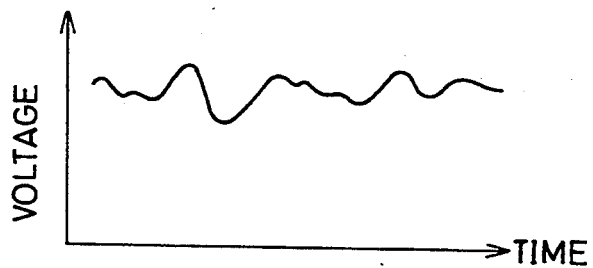

Herein, fluctuation in intensity of a reflected light due to medium noise and light source noise is independent of polarization components. Noise in the output voltages obtained from the current/voltage converting units 43a and 43b have the same amplitude and the same phase as shown in FIGS. 15A and 15B. It is therefore possible to effectively remove the noise from a reproduced signal by finding a difference between the output voltages from the current/voltage converting units 43a and 43b by the differential amplifier 44.

Medium noise and light source noise can be effectively removed similarly to the above-described case by irradiating the optical recording medium with a circularly polarized reading beam by a ¼ wavelength plate provided in place of the polarization canceling plate 38. In a case where a semiconductor laser device outputting a divergent light is used as the light source 35b for reproduction, the optical beam shaping element 34 including a collimator may be used and where a gas laser device is used, the optical element 34 including a beam expander may be used.

FIG. 16 illustrates one example of a recording/reproducing device capable of recording and reproducing information on and from an optical recording medium. Two linearly polarized optical beams output from light sources 51a and 51b such semiconductor laser devices which can be directly driven by current have the same wavelength. The polarization planes of these beams are set to be orthogonal to each other when directed onto the optical recording medium 31.

In recording information, the information recording signal A shown in FIG. 17 is transmitted to the point A of a driving circuit 52a for the light source 51a, while the information recording signal B which is an inversion of the information recording signal A by an inverter 46 is transmitted to the point B of a driving circuit 52a for the light source 51b. When the light source 51a is on for emitting a laser beam, the light source 51b is off for emitting no laser beam. In other words, the light sources 51a and 51b assume on/off states reversely to each other, which states are switched in response to the information recording signals.

The linearly polarized laser beam output from the light source 51a is shaped by an optical beam shaping element 34a including a collimator lens or a beam expander, which beam is transmitted through a half mirror 53a. The writing beam is reflected by a polarized beam splitter 55 and then focused on a recording layer of an optical recording medium 31 by an objective lens 32. A linearly polarized laser beam output from the light source 51b is shaped by an optical beam shaping element 34b and transmitted through a half mirror 53b. After being transmitted through the polarized beam splitter 55, the writing beam is focused on the recording layer of the optical recording medium 31 by the objective lens 32.

The polarized beam splitter 55 and the light sources 51a and 51b have their orientations set to allow the polarization planes of the two writing laser beams to be orthogonal to each other on the recording layer of the optical recording medium 31. Therefore, a linearly polarized writing laser beam having $\theta=0°$ corresponding to the data "1" and $\theta=90°$ corresponding to the data "0", for example, is focused on the recording layer in response to information recording signals, thereby writing information.

In reproducing the information, switches 45a and 45b are switched to a reproduction mode in response to a mode control signal for switching a recording mode to/from a reproduction mode, and the driving circuits 52a and 52b are controlled in response to a control voltage such that the light sources 51a and 51b output a linearly polarized laser beam with a fixed low intensity. Similarly to the recording of the information, the laser beam output from the light sources 51a and 51b are focused on the recording layer of the optical recording medium 31 so as to have their light polarizations orthogonal to each other.

The laser beams directed onto the recording layer have their intensities of the respective polarization components modified depending on the recorded information and then reflected by the optical recording medium 31. The reflected optical beam is again separated into two beams of polarization components by the polarized beam splitter 55. One polarization component is reflected by the half mirror 53a and converged on a photodetector 57a by a lens 56a. An output current of the photodetector 57a is converted into a voltage by a current/voltage converting unit 58a. The other polarization component is reflected by the half mirror 53b and focused on a photodetector 57b by a lens 56b. An output current of the photo detector 57b is converted into a voltage by a current/voltage converting unit 58b.

The output voltages (corresponding to information signals) output from the current/voltage converting units 58a and 58b have phases opposite to each other, while the medium noise and the light source noise have the same phase and the same amplitude. As a result, a reproduced signal obtained by a differential amplifier 60 through subtraction of one from the other of the output voltages from the current/voltage converting units 58a and 58b has its noise effectively removed.

Although in the embodiment of FIG. 16, information is recorded by irradiation of linearly polarized lights whose polarization components are orthogonal to each other in response to the data "0" and "1", information can be also recorded by radiating a linearly polarized light in response to one of the data "0" and "1" and radiating no light in response to the other data. It is possible to effectively remove medium noise and light source noise when information recorded on an optical recording medium in such a manner as described above is reproduced by the recording/reproducing device of FIG. 16. The effect of the present invention can be obtained to some extent even if polarization planes of two linearly polarized lights are not necessarily orthogonal to each other.

It is also possible to record information by irradiation of a circularly polarized light or a random polarized light in response to the data "0" and a linearly polarized light in response to the data "1". It can be understood that such recording also enables reproduction of information with noise effectively reduced.

Furthermore, the use of an elliptically polarized light in place of a linearly polarized light enables recording of information because the elliptically polarized light can cause optical anisotrophy, so that information can be reproduced to have effectively reduced noise.

In addition, although information can be reproduced by irradiating a circularly polarized light, a random polarized light or a light including two linear polarization components orthogonal to each other, medium noise and light source noise can be also reduced even when information is reproduced by irradiation of a light including a linear polarization component not coincident with a major axis or a minor axis of a linearly polarized light or an elliptically polarized light used in recording the information. The meaning of light containing a linear polarization component not coincident with a polarization plane of a linearly polarized light or with a major axis or a minor axis of an elliptically polarized light includes a linearly polarized light, a circularly polarized light and an elliptically polarized light and further includes simultaneous irradiation of lights in two different polarization states. In a case of information is recorded by two linearly polarized lights orthogonal to each other, for example, the information can be reproduced to have reduced medium noise or light source noise, by using a linearly polarized light having a polarization plane at 45° away from the polarization planes of these two linearly polarized lights. A reproduced signal with reduced noise can be obtained by using a linearly polarized light having a polarization plane at other angle than 0° away from polarization planes of two linearly polarized writing lights.

An optical recording medium including various photochromic materials can be used for the above-described recording/reproducing method according to the fourth embodiment, wherein a wavelength of a light to be radiated can be appropriately selected in consideration of characteristics of the photochromic materials. It can be also understood that the fourth embodiment is applicable to a transmission type optical recording medium. Furthermore, although a linearly polarized light output from a light source is converted to assume other polarization states by ¼ wavelength plate or the like, a light source can be used instead which directly outputs a light in a desired polarization state. A wavelength of a light for use in recording needs not to be the same as that of a light for use in reproduction according to the fourth embodiment. It will be also understood that the method of reproducing information on an optical recording medium according to the fourth embodiment is applicable to a common optical recording medium on which information is recorded as a result of caused optical anisotrophy.

Figure 18:
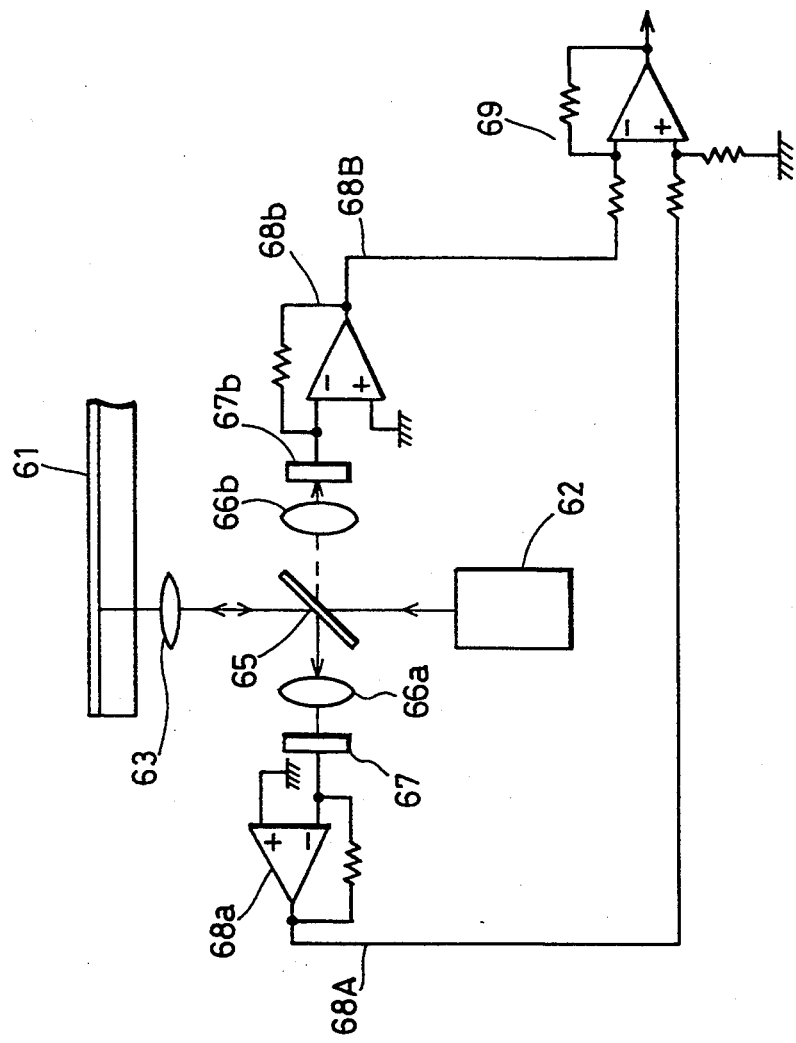
FIG. 18 is a diagram showing a reproducing device according to a fifth embodiment.

FIG. 18 shows a reproducing device according to a fifth embodiment of the present invention. Possible media as an optical recording medium 61 include a compact disk, a write once type optical disk, a phase changing optical disk, magnet-optical disk and an optical disk made of a photon mode material, from which media information signals can be reproduced by a detection of a change in reflectance. Used as a light source 62 is a laser device etc. outputting a light having a wavelength or a polarization state suitable for the optical recording media 61. More specifically, used as the light source 62 is such a gas laser device as a He—Ne laser device or an Ar laser device, a semiconductor laser device or a laser device using a SHG element.

An optical beam output from the light source 62 enters a half mirror 65, a part of which optical beam is transmitted therethrough and the remaining portion is reflected by the half mirror 65. The optical beam having been transmitted through the half mirror 65 is focused on the optical recording medium 61 by an objective lens 63, the intensity of which focused beam is modulated according to recorded information and then reflected by the recording medium 61.

The reflected optical beam, after being reflected by the half mirror 65 through the objective lens 63, is converged on a photodetector 67a by a lens 66a. An output current of the photodetector 67a is converted into an output voltage (output signal) 68A by a current/voltage conversion system 68a.

On the other hand, the part of the optical beam emitted from the light source 62 and reflected by the half mirror 65 without being transmitting through the same, is converged on a photodetector 67b by a lens 66b. An output current of the photodetector 67b is converted into an output voltage (output signal) 68B by a current-/voltage conversion system 68b.

The output voltage 68A obtained from the current-/voltage conversion system 68a includes an information signal and light source noises, while the output voltage 68B obtained from the current/voltage conversion system 68b includes light source noises but not an information signal. The light source noises in these output voltages 68A and 68B have the same phase. Noises in the currents output from the photosensors 67a and 67b, however, have magnitudes different from each other in general because of effects of the optical recording medium 61 and the half mirror 65. Therefore, the current-/voltage conversion systems 68a and 68b and amplification characteristics of a differential amplifier 69 are adjusted in advance such that these noises are canceled with each other.

The light source noise can be therefore removed by obtaining a reproduced signal generated by subtracting the output voltage 68B from the output voltage 68A in the differential amplifier 69.

Figure 19:
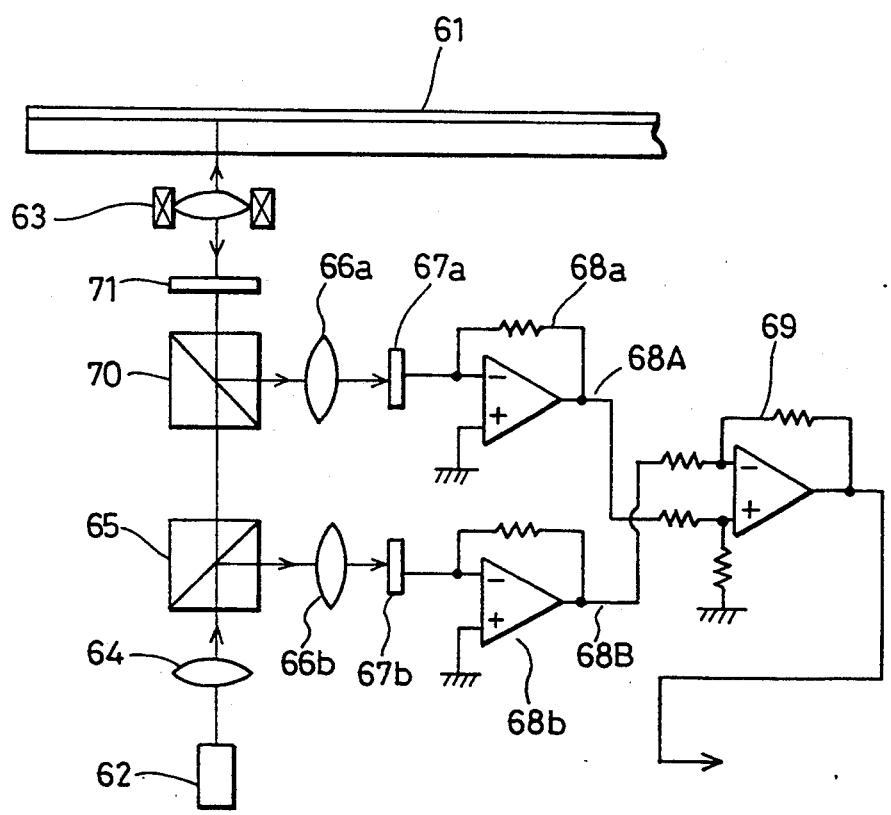
FIG. 19 is a diagram showing a reproducing device according to a sixth embodiment.

FIG. 19 shows a reproducing device according to a sixth embodiment of the present invention, wherein the same members as those of the embodiment shown in FIG. 18 are given the same reference numerals. In this device, a linearly polarized optical beam output from a light source 62 is shaped by an optical beam shaping element 64 including a collimator lens or a beam expander. A part of the optical beam is reflected by a half mirror 65 and converged on a photodetector 67b by a lens 66b. An output current of the photodetector 67b is converted into an output voltage 68B by a current/voltage conversion system 68b. The remaining part of the optical beam from the light source 62 is transmitted through the half mirror 65 and a polarized beam splitter 70, then converted from the linearly polarized light into a circularly polarized light by a ¼ wavelength plate 71 and focused on an optical recording medium 61 by an objective lens 63.

The optical beam focused on the optical recording medium 61 has its intensity modulated according to recorded information and then emitted from the optical recording medium 61. The reflected optical beam is transmitted through the objective lens 63 in a reverse direction and converted into a linearly polarized light having a polarization plane orthogonal to the polarization plane of the original linearly polarized light by the ¼ wavelength plate 71. The converted linearly polarized light is reflected by the reflected beam splitter 70 and then converged on a photodetector 67a by a lens 66a. An output current of the photodetector 67a is converted into an output voltage 68A by a current/voltage conversion system 68a.

Similarly to the embodiment of FIG. 18, the output voltage 68A obtained from the current/voltage conversion system 68a includes an information signal and light source noise, while the output voltage 68B obtained from the current/voltage conversion system 68b includes light source noise but not an information signal in the embodiment shown in FIG. 19. The light source noises in the output voltages 68A and 68B have the same phase. The noises in the currents output from the photosensors 67a and 67b, however, have magnitudes different from each other in general because of the effects of the optical recording medium 61 and the half mirror 65. The current/voltage conversion systems 68a and 68b and amplification characteristics of a differential amplifier 69 are adjusted in advance such that these noises are canceled with each other. Light source noises therefore can be removed by obtaining a reproduced signal generated by subtracting the output voltage 68B from the output voltage 68A in the differential amplifier 69.

Figure 20:
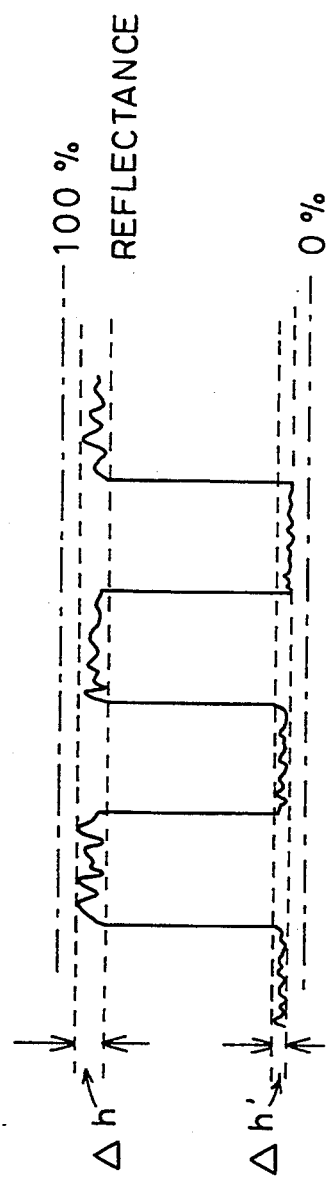
FIGS. 20A, 20B and 20C are waveform diagrams each showing a relationship between a reflectance of an optical recording medium and an amplitude of a noise signal.

According to the embodiments shown in FIGS. 18 and 19, information is reproduced by utilizing a property that an intensity of a reflected light by the optical recording medium 61 attains a high level or a low level in response to a recorded information signal. The amplification $\Delta$ h of noise is increased when the intensity of the reflected light is high, while the amplitude $\Delta h'$ of the noise is reduced when the intensity of the reflected light is at low. In other words, as shown in FIG. 20A, when each optical recording medium 61 in the embodiments shown in FIGS. 18 and 19 has a large amount of reflectance change, that is, a large modulation degree, there is a large difference between a noise amplitude $\Delta$ h when the intensity of the reflected light is at a high level and a noise amplitude $\Delta$ h' when the same is at a low level. Therefore, it is impossible to effectively cancel both of the noise $\Delta$ h with a large amplitude and the noise $\Delta$ h' with a small amplitude even if a noise signal in the output voltage 68B as shown in FIG. 20B is subtracted from a noise signal in the output voltage 68A as shown in FIG. 20A.

It is therefore preferable to apply the embodiments shown in FIGS. 18 and 19 to, for example, a phase changing optical disk with a small modulation degree or a magnet-optical recording medium from which information is reproduced by using circular dichroism obtained through irradiation of a circularly polarized light.

Figure 21:
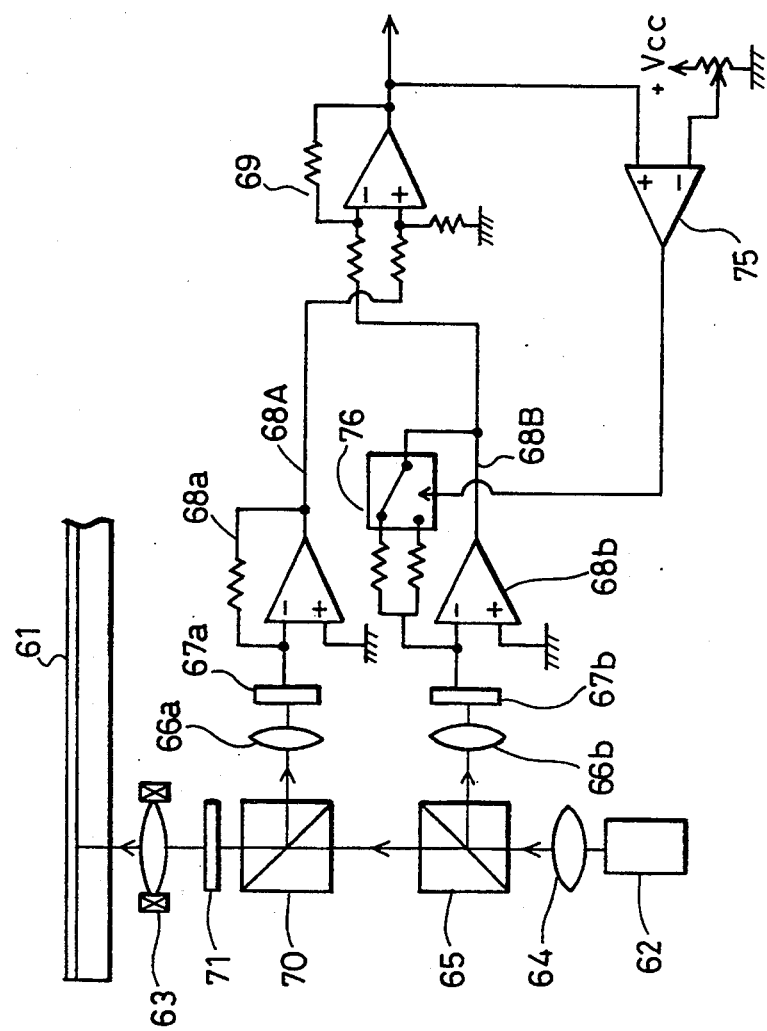
FIG. 21 is a diagram showing a reproducing device according to a seventh embodiment.

FIG. 21 shows a reproducing device according to a seventh embodiment of the present invention. The present embodiment enables effective reduction of light source noise for such an optical recording medium as CD having a small modulation degree. The same reference numerals are allotted to the same portions in the reproducing device of FIG. 21 as those of the devices shown in FIGS. 18 and 19. In the embodiment of FIG. 21, when the level of a reproduced output obtained from a differential amplifier 69 becomes high, the output of a comparator 75 including an amplifier is increased. As a result, a switch 76 for changing an amplification factor of a current/voltage conversion system 68b is switched to increase the amplification factor of the current/voltage conversion system 68b. When the reproduced output obtained from the differential amplifier 69 attains a low level, the switch 76 is reversely switched to reduce the amplification factor of the current/voltage conversion system 68b.

As shown in FIG. 20C, an output voltage 68B of the current/voltage conversion system 68b is changed according to the modulation degree of an optical recording medium 61 similarly to the output voltage 68A shown in FIG. 20A. The differential amplifier 69 therefore can effectively reduce both of noise in a high level information signal and noise in a low level information signal.

Although the switch 76 appropriately changes the amplification factor of the current/voltage conversion system 68b in the embodiment of FIG. 21 in order to effectively reduced noise, an amplification factor of the differential amplifier 69 may be appropriately changed instead. In addition, an output 68A of a current/voltage conversion system 68a may be input, in place of the reproduced output of the differential amplifier 69, to the comparator 75 in order to control switching of the switch 76. However, the comparator 75 might malfunction because the output 68A of the current/voltage conversion system 68a includes light source noise. It is therefore more preferable that the reproduced output of the differential amplifier 69 is input to the comparator 75.

In order to efficiently cancel noise through a wide bandwidth, it is desirable to set two detection systems including photodetectors 67a and 67b and the current-/voltage conversion systems 68a and 68b, respectively, to have the same characteristics (through the use of photodetectors and amplifiers of the same characteristics and the uniformity of a wiring code length etc.), thereby preventing phase characteristics of the noises in the two detection systems from differing from each other. In addition, the amplifiers of the current/voltage conversion systems 68a and 68b and the differential amplifier 69 desirably operate in a bandwidth as wide as possible.

It can be understood that the reproduction methods shows in FIGS. 18, 19 and 21 are applicable to a transmission type optical recording medium if a light wavelength and a polarization state are adequately selected according to a type of optical recording medium while an optical element is also appropriately changed.

An eighth embodiment of the present invention will be described with reference to FIGS. 22 to 28. First, the principle applied to the eighth embodiment of the present invention will be described with reference to FIGS. 22 and 23.

Figure 22:
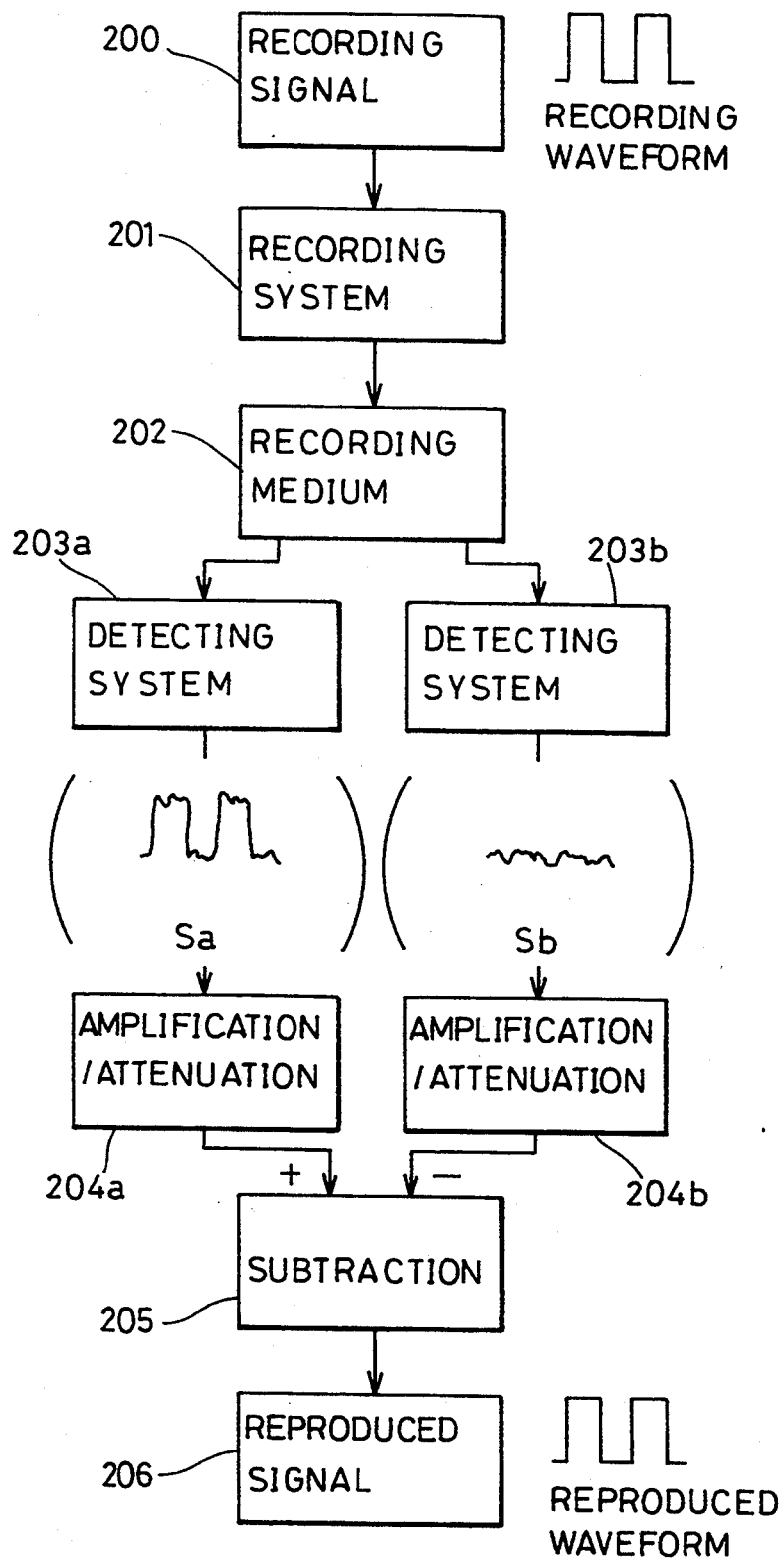
FIG. 22 is a flow chart illustrating the principle of a eighth embodiment.
Figure 23:
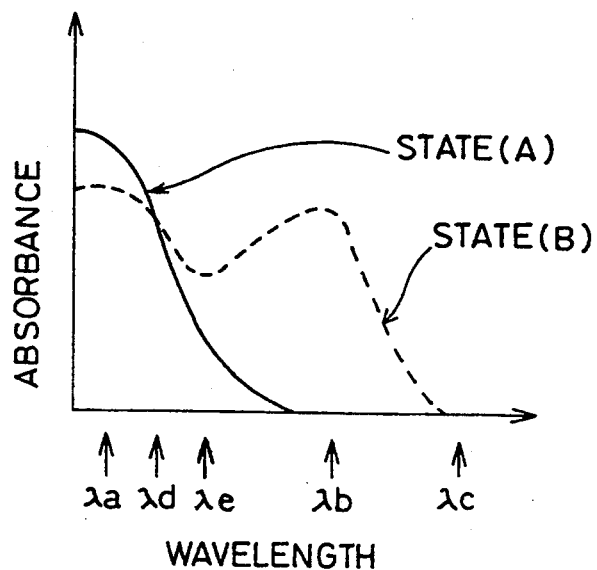
FIG. 23 is a graph showing one example of light absorption characteristics of a photochromic material.

FIG. 22 shows a process of recording and reproducing information on and from an optical recording medium including a recording layer made of a photochromic material. The recording layer of a photochromic material has such absorption characteristics as shown in FIG. 23, for example. In the graph of FIG. 23, the abscissa represents a wavelength of a light and the ordinate represents light absorbance of the recording layer. That is, irradiating, with a light with a wavelength $\lambda_a$, the recording layer in state A where the layer has the light absorption characteristics indicated as the solid curve, causes the layer to assume state B where the layer has absorption characteristics indicated as the broken curve. Conversely, irradiation of a light with a wavelength $\lambda_b$ causes the recording layer in state B to return to state A. As conventionally performed, recording of information is first carried out by changing a recording spot on an optical recording medium from state A to state B according to recorded information.

As shown in FIG. 22, for example, irradiation of a light with a wavelength $\lambda_a$ is carried out in response to an information recording signal (information recording signal waveform) 200 in a recording system 201, thereby recording information on an optical recording medium 202.

For reading the information, a recording spot is irradiated with a reading optical beam having a wavelength $\lambda_b$, for example, with low power. A detection system 203a detects a reading optical signal Sa changing (a change of a reflectance or transmittance) depending on light absorbance of the recording spot. At the same time, the detection system 203b detects, independently of the signal Sa, a signal Sb (a change of a reflectance or transmittance) obtained by irradiating the recording spot with a light having the same light absorbance in states A and B, that is, a light with the wavelength $\lambda_c$ or the wavelength $\lambda_d$ shown in FIG. 23, for example.

The signal Sa includes an information signal and medium noise, while the signal Sb includes medium noise only. Medium noises have the same phase in signals Sa and Sb obtained based on two reading lights directed to the same recording spot. The signals Sa and Sb are appropriately amplified or attenuated by amplification-/attenuation systems 204a and 204b, respectively, such that the amplitudes of the medium noises included in the signals coincide with each other.

As a result, subtraction of the signal Sb from the signal Sa by a subtraction circuit 205 obtains a reproduced signal (reproduced signal waveform) 206 with noise effectively reduced.

Figure 24:
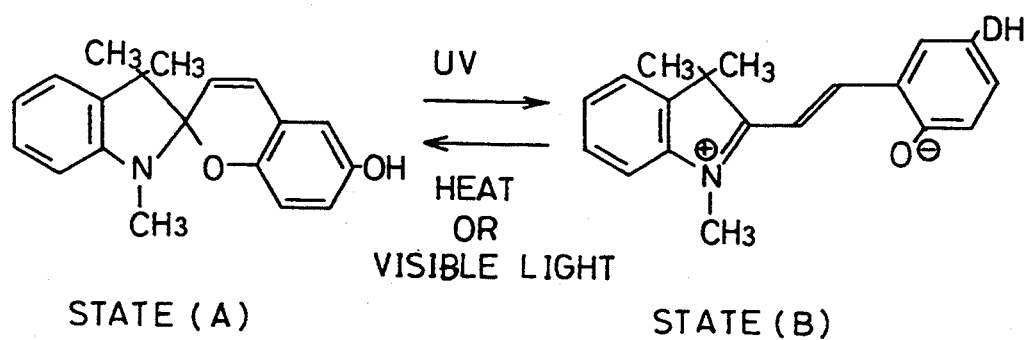
FIG. 24 is a diagram showing a photochemical reaction of the photochromic material which can be used in the eighth embodiment.
Figure 25:
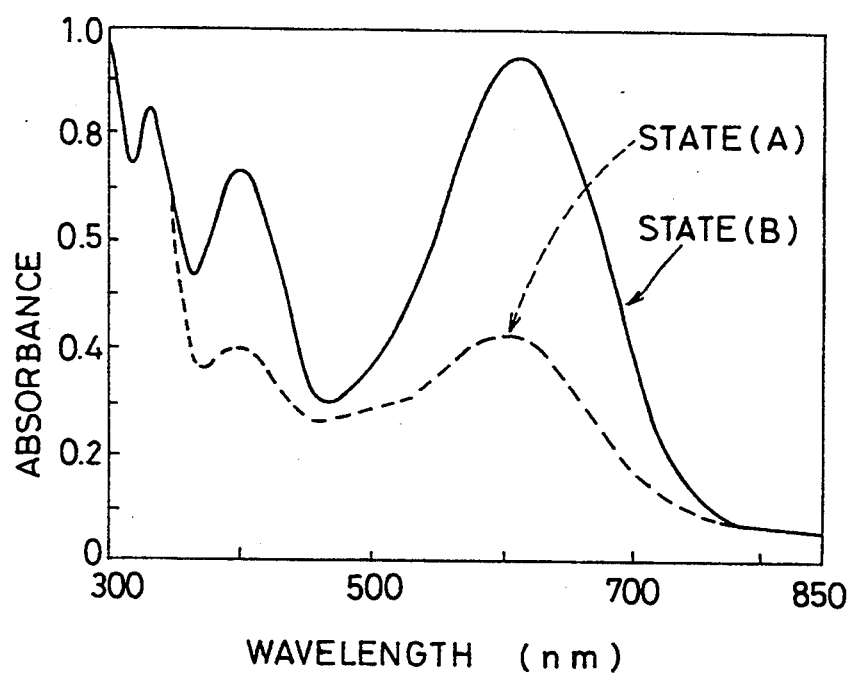
FIG. 25 is a diagram showing light absorption characteristics of the photochromic material of FIG. 24.

In the eighth embodiment, possible materials for the recording layer include spiro-pyrane type, azobenzene type, fulgide type and diaryl-ethene type photochromic materials and the like. Herein, description will be made, as an example, of a recording layer made of a spiro-pyrane type photochromic material which assumes state A or B according to a photochemical reaction as shown in FIG. 24 and has its light absorption characteristics changing as shown in FIG. 25.

For manufacturing an optical recording medium, a recording layer including a spiro-pyrane type photochromic material of 1 μm thick is formed on a 1.2 mm thick glass substrate by vacuum deposition and then a 1000 Å thick aluminum reflective layer is formed on the recording layer by vacuum deposition.

Recording of information (forming recording marks) on thus formed optical recording medium can be done by irradiating the entire medium with an ultraviolet light to assume state B (erased/non-recorded state) and radiating a He—Ne laser beam with a wavelength of 633 nm, for example, at high power (10 mW, for example) to cause a recording spot to enter state A.

It is therefore possible to obtain a signal including reproduced information and medium noise by detecting a change of a reflectance in response to a change of light absorbance with respect to a light having a wavelength of about 600 nm, for example. In addition, light is scarcely absorbed in a wavelength range from 780 to 850 nm, for example. Therefore, a reflected light (or transmitted light) obtained by irradiating an optical recording medium with a light in this wavelength range can be detected as a signal including no reproduced information but including only medium noise.

Figure 26:
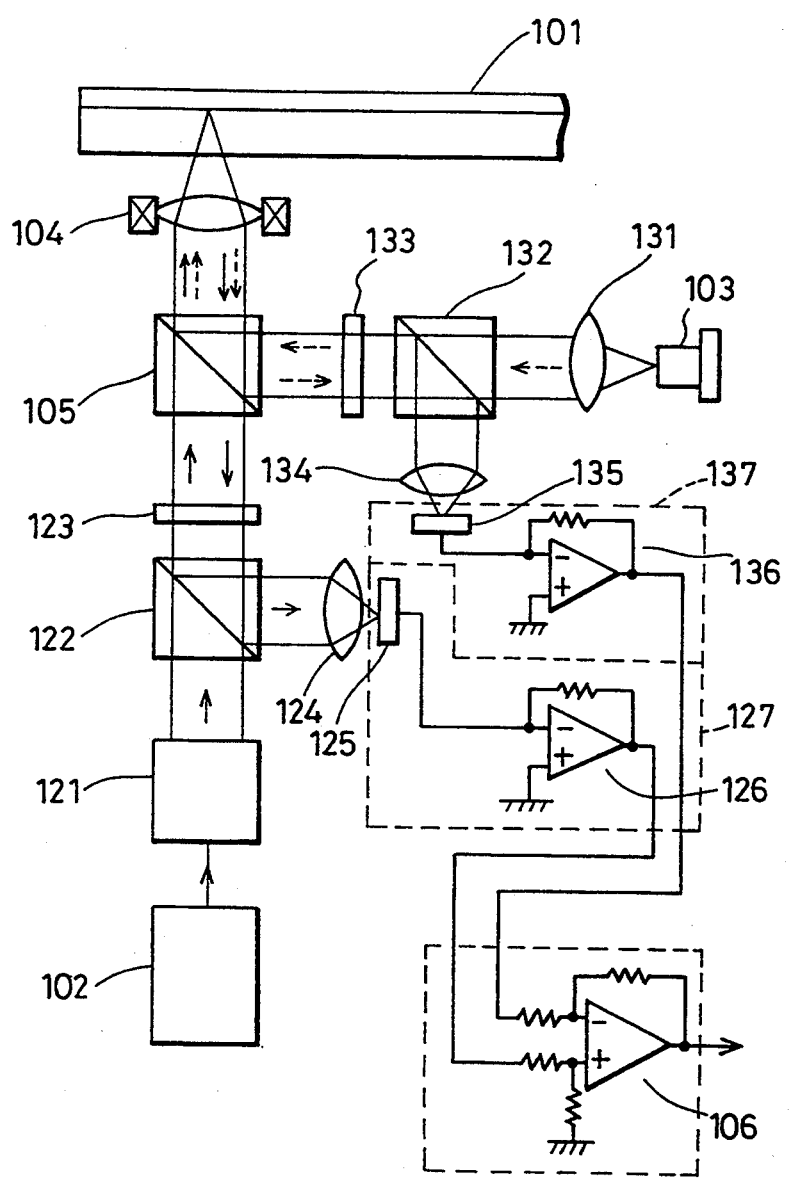
FIG. 26 is a diagram showing a reproducing device according to the eighth embodiment.

FIG. 26 shows one example of a reproducing device for reproducing information recorded on an optical recording medium. Used as a light source 102 is a He—Ne laser device outputting a linearly polarized laser beam with a wavelength of 633 nm, for example, and used as a light source 103 is a semiconductor laser device outputting a linearly polarized laser beam with a wavelength of 780 nm, for example. An objective lens system 104 includes an objective lens for two wavelengths designed to be applicable to optical beams output from the light sources 102 and 103, and an actuator for driving the objective lens. A dichroic mirror 105 is oriented to allow complete transmission of the optical-beam output from the light source 102, completely reflect the optical beam output from the light source 103 and make the axes of these two optical beams heading for the objective lens system 102 to coincide with each other.

A weak laser beam (with an output of 1 mW, for example) output from the light source 102 is expanded by a beam expander 121 and then is transmitted through a polarized beam splitter 122, which beam is converted from a linearly polarized light into a circularly polarized light by a ¼ wavelength plate ($\lambda/4$ plate) 123. The circularly polarized light is transmitted through the dichroic mirror 105 and focused as a projected spot on the recording layer of an optical recording medium 101 by the objective lens system 104. The light directed onto the recording portion has its intensity modulated according to recorded information and medium noise, and the modulated light is reflected by the optical recording medium 101. The reflected beam is transmitted through the objective lens system 104 and the dichroic mirror 105 in a reverse direction and converted into a linearly polarized light orthogonal to the initial linearly polarized light by the ¼ wavelength plate 123. The converted linearly polarized light is reflected by the polarized light beam splitter 122 and converged on a photodetector 125 by a lens 124, which light is detected by a detection system 127 including an amplifier 126 or the like as a signal including an information signal and medium noise.

Meanwhile, a laser beam (with an output of 1 mW, for example) output from the light source 103 simultaneously with the laser beam from the light source 102, is shaped by a collimator lens 131, transmitted through a polarized beam splitter 132 and converted from a linearly polarized light into a circularly polarized light by a ¼ wavelength plate 133. The circularly polarized light is reflected by the dichroic mirror 105 and focused on a spot of the recording layer by the objective lens system 104. At this time, the optical beam emitted from the light source 103 enters the same spot as the recording spot which the optical beam emitted from the light source 102 enters.

At the wavelength of the light output from the light source 103, not a reflectance is changed in response to the recorded information signal but only an intensity is modulated according to medium noise. The optical beam focused on the recording spot therefore has its intensity modulated only according to the medium noise and is reflected by the optical recording medium 101.

The reflected light is transmitted through the objective lens system 104 in a reverse direction, reflected by the dichroic mirror 105 and converted into a linearly polarized light orthogonal to the initial linearly polarized light by the ¼ wavelength plate 133. The converted linearly polarized light is reflected by the polarized beam splitter 132, converged on a photodetector 135 by a lens 134 and detected by a detection system 137 including an amplifier 136.

The medium noises included in the two signals detected respectively by the two detection systems 127 and 137 have the same phase. In addition, with the amplifiers 126 and 136 in the detection systems 127 and 137, respectively, and/or a differential amplifier 106 adjusted in advance to make the amplitudes of the medium noises coincide with each other, the medium noises can be effectively reduced by subtracting, in the differential amplifier 106, an output signal of the detection system 137 from an output signal of the detection system 127.

The amplifiers 126 and 136 and/or the differential amplifier 106 are adjusted to have the minimum noise under the same conditions as those of the reproduction of information. More specifically, a resistance value of the amplifier 126, the resistance value of the amplifier 136 and/or the resistance value of the differential amplifier 106 are adjusted to reduce noise by irradiating the same spot on the optical recording medium with the two optical beams simultaneously output from the light sources 102 and 103 while observing the noise in the signal output from the differential amplifier 106 by means of a measuring device such as a spectrum analyzer. It is desirable to provide a circuit for subtracting direct current components from the two signals detected by the detection systems 127 and 137 before the two signals are input to the differential amplifier 106.

Although FIG. 26 shows an example using a light with a wavelength of 780 nm for detecting medium noise, a light with a wavelength of about 460 nm can be also used. That is, as can be seen from FIG. 25, a difference in light absorbance of the light of about 460 nm is so small between a recorded state and a non-recorded state that recorded information is scarcely detected. It is therefore possible to obtain the reproducing device shown in FIG. 27 by partly modifying that shown in FIG. 26.

Figure 27:
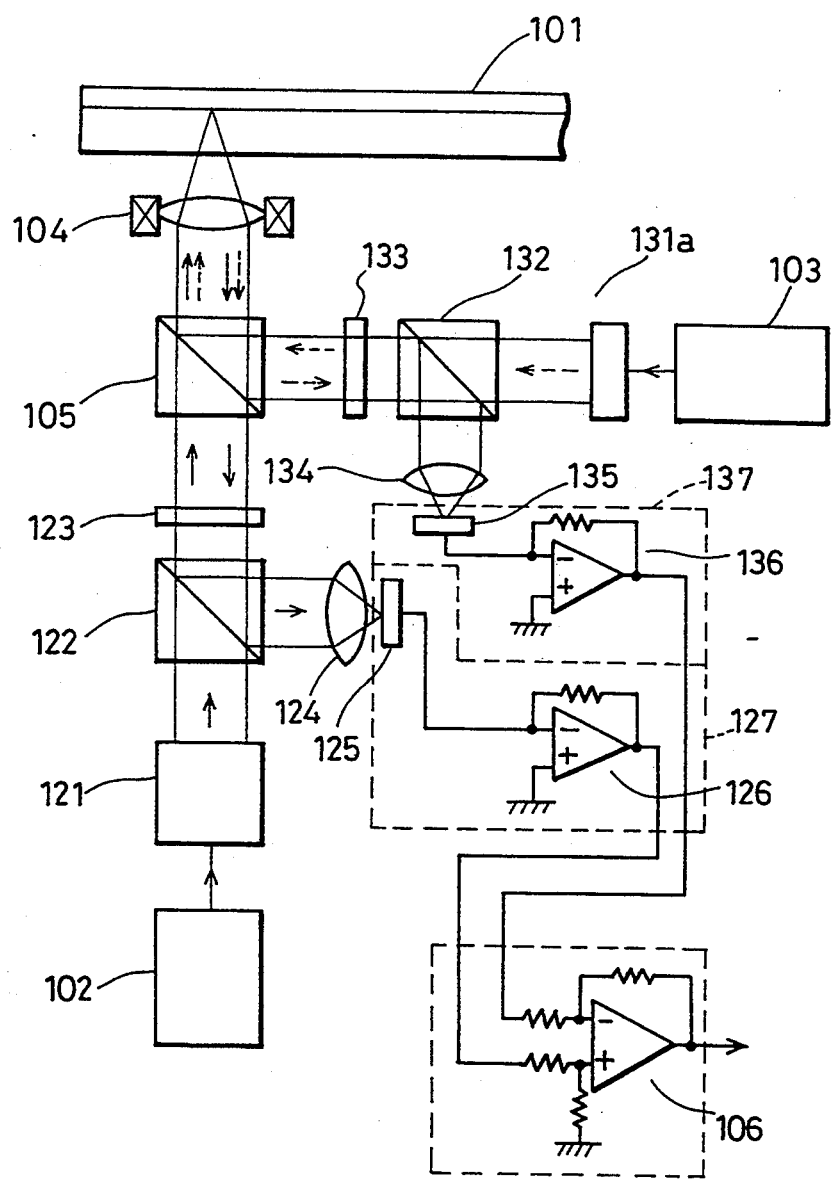
FIG. 27 is a diagram showing one example of a reproducing device obtained by partly modifying the reproducing device of FIG. 26.

The reproducing device of FIG. 27 is similar to that of FIG. 26 with a difference in that an Ar laser device emitting a light with a wavelength of 458 nm, for example, is provided in place of the light source 103 and a beam expander 131a is provided in place of the collimator lens 131.

Similarly, as can be seen from FIG. 25, a difference in light absorbance of the light having a wavelength of about 750 nm or 300-350 nm is so small between a recorded state and a non-recorded state that such lights can be used for detecting medium noise only.

Although in the eighth embodiment, the amplitudes of medium noises in two signals are made to coincide with each other by adjusting amplification characteristics of the amplifiers 126 and 136 and/or the differential amplifier 106, it is more preferable to do so by adjusting the intensity of the light output from the light source 102 or the light source 103 while setting the amplification characteristics of the amplifiers 126 and 136 and the differential amplifier 106 to be constant. This is because no consideration is required of a change in phase characteristics and in frequency characteristics due to a change in amplification characteristics and because there is no possibility of a frequency band being narrowed wherein noise can be reduced. In addition, since the light with the wavelength of 780 nm causes no photochemical reaction in the photochromic material even if the output of the light source 103 is increased, recorded information will not be destroyed.

In addition, a light having a wavelength enabling detection of recorded information and a light having a wavelength enabling a detection of a slight amount of recorded information are simultaneously emitted onto the same recording spot in the embodiments shown in FIGS. 26 and 27. In place of such simultaneous irradiation, a time delay between two signals obtained based on the two lights may be adjusted by a delay circuit or the like to make subtraction between the two signals directed onto the same recording spot.

A spot diameter d of a projected light on an optical recording medium will be expressed as approximate to $\lambda/NA$ with $\lambda$ as a wavelength of the light and NA as the numerical aperture of the objective lens 104. Therefore, diameters of spots projected by a light with a wavelength of 780 nm and that with a wavelength of 633 nm differ from each other, resulting in incomplete removal of medium noise in a high frequency range.

Figure 28:
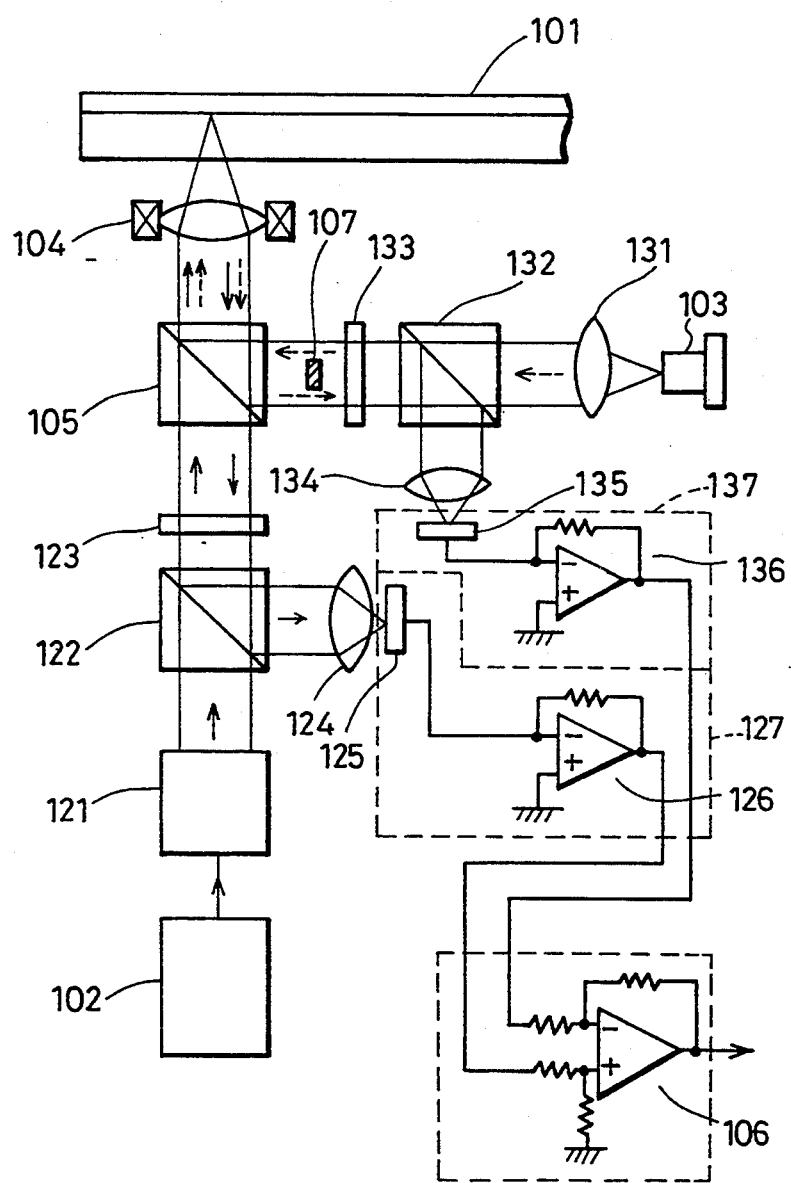
FIG. 28 is a diagram showing another example of a reproducing device obtained by partly modifying the reproducing device of FIG. 26.

In order to solve the above-described problem, the reproducing device of FIG. 26 can be partly modified as shown in FIG. 28. The device shown in FIG. 28 includes a circular-plate-shaped shielding member 107 provided between the ¼ wavelength plate 133 and the dichroic mirror 105. A conventional super-resolution technique of shielding the central portion of a light having been transmitted through the ¼ wavelength plate 133 reduces the diameter of a spot projected by a light (with a wavelength of 780 nm) output from the light source 103. The size of the shielding member 7 is selected such that the diameter of the spot projected by the light output from the light source 103 becomes equal to that of a spot projected by a light (wavelength of 633 nm) output from the light source 102. For using a light having a wavelength larger than that of a light enabling detection of recorded information as a light having a wavelength enabling a detection of only a slight amount of recorded information, it is desirable that the wavelength of the light enabling a detection of only a slight amount of recorded information is as approximate to the wavelength of the light enabling detection of recorded information as possible. This enlarges a frequency band wherein medium noise can be reduced and facilitates the above-described super resolution technique to make diameters of spots projected by lights to coincide with each other.

On the other hand, using a light with a wavelength shorter than that of a light enabling detection of recorded information as a light with a wavelength enabling a detection of only a slight amount of recorded information, results in some medium noise left unremoved because of a difference in a diameter of a spot projected by light. However, the light with a shorter wavelength obtains a spot projected by light of smaller diameter, thereby detecting medium noise in a wide frequency band, so that the medium noise can be reduced in a wider frequency band.

Furthermore, various photochromic materials can be used for a recording layer of an optical recording medium. However, it is necessary to appropriately change a wavelength and an intensity of lights from the light sources 102 and 103 and change an optical element to be suitable for the changed wavelength according to a type of photochromic material for use. Such changes can be easily made by a person skilled in the art.

A write once type optical recording medium including a recording layer made of an organic pigment material allows detection of only medium noise through irradiation of a light having a wavelength which cannot be absorbed by the material. As a result, the medium noise can be reduced in same manner as that of the present embodiment.

The following is mathematical expressions of a method of reducing noise according to the above-described eighth embodiment using a recording medium having such characteristics as shown in FIG. 23. An output voltage $V_B$ corresponding to a first beam having a wavelength $\lambda_b$ enabling read of information will be expressed by the equation (1), with $\omega$ as a frequency of an information signal, $n(t)$ as a noise component and t as time.

$$V_B = \cos \omega t + n(t) \quad (1)$$

Herein, the term including $\omega$ is normalized.

An output voltage $V_c$ corresponding to a second beam with a wavelength $\lambda_c$ disabling read of information will be expressed by equation (2).

$$V_c = \alpha n(t) \quad (2)$$

That is, the output voltage $V_c$ does not include an information component but only a noise component having the same phase as that of the noise component in equation (1). $\alpha$ denotes a detector efficiency and a positive constant depending on beam power.

Herein, equation (3) can be obtained by {equation (1) $-(1/\alpha)\times$ equation (2)}.

$$V_{B-C} = \cos \omega t \quad (3)$$

As can be seen from equation (3), the medium noise is completely removed theoretically and C/N becomes infinite. In reality, however, C/N takes a finite value because of noise generated in the circuit, light source noise, shot noise etc. and because a common mode rejection ratio of a differential amplifier is infinite.

When a light with a wavelength $\lambda_b$ is used as a first beam and a light with a wavelength $\lambda_e$ shown in FIG. 23 is used as a second beam, a signal component of a frequency $\omega$ and a noise component $n(t)$ included in an output $V_E$ corresponding to the second beam have the same phase as that of the output $V_B$. The signal component and the noise component included in the output $V_E$ have amplitudes different from those of $V_B$ depending on the amount of reflectance change, sensor efficiency and a difference in beam power. $V_E$ will be expressed by equation (4) as a result:

$$V_E = \beta \cos \omega t + \gamma n(t) \quad (4)$$

wherein $\beta$ and $\gamma$ are appropriate positive constants.

Equation (5) can be obtained herein by {equation (1)$-(1/\gamma)\times$equation (4)}.

$$V_{B-E} = (1-\beta/\gamma) \cos \omega t \quad (5)$$

It can be seen that the medium noise component is also removed in equation (5) to improve C/N. However, with $(1-\beta/\gamma)$ smaller than 1, C/N obtained by equation (5) might be smaller than C/N obtained by equation (3).

Consideration will be given to the use of a light with a wavelength $\lambda_a$, as the second beam. In this case, a change of the recording layer from state A to state B is followed by an increase in light absorbance with respect to a wavelength $\lambda_b$ and by a reduction in light absorbance with respect to a wavelength $\lambda_a$, as can be seen from FIG. 23. More specifically, the signal component of the frequency $\omega$ included in the output $V_A$ corresponding to the beam with the wavelength $\lambda_a$ has a phase opposite to that included in $V_B$, while the noise components in the outputs $V_A$ and $V_B$ have the same phase. However, since amplitudes of an information signal and noise depend on the amount of reflectance change, sensor efficiency and beam power etc. similarly to the case of equation (4), the output $V_A$ will be expressed by equation (6).

$$V_A = -\delta \cos \omega t + \kappa n(t) \quad (6)$$

herein $\delta$ is an appropriate positive constant. Equation (7) is obtained by {equation (1)$-1/\kappa$)$\times$equation (6)}.

$$V_{B-A} = (1 + \delta/\kappa) \cos \omega t \quad (7)$$

That is, it can be understood that the medium noise component is also removed in equation (7) to improve C/N. In this case, since $(1+\delta/\kappa)$ is larger than 1, C/N obtained by equation (7) takes a value larger than C/N obtained by equation (3).

Figure 29:
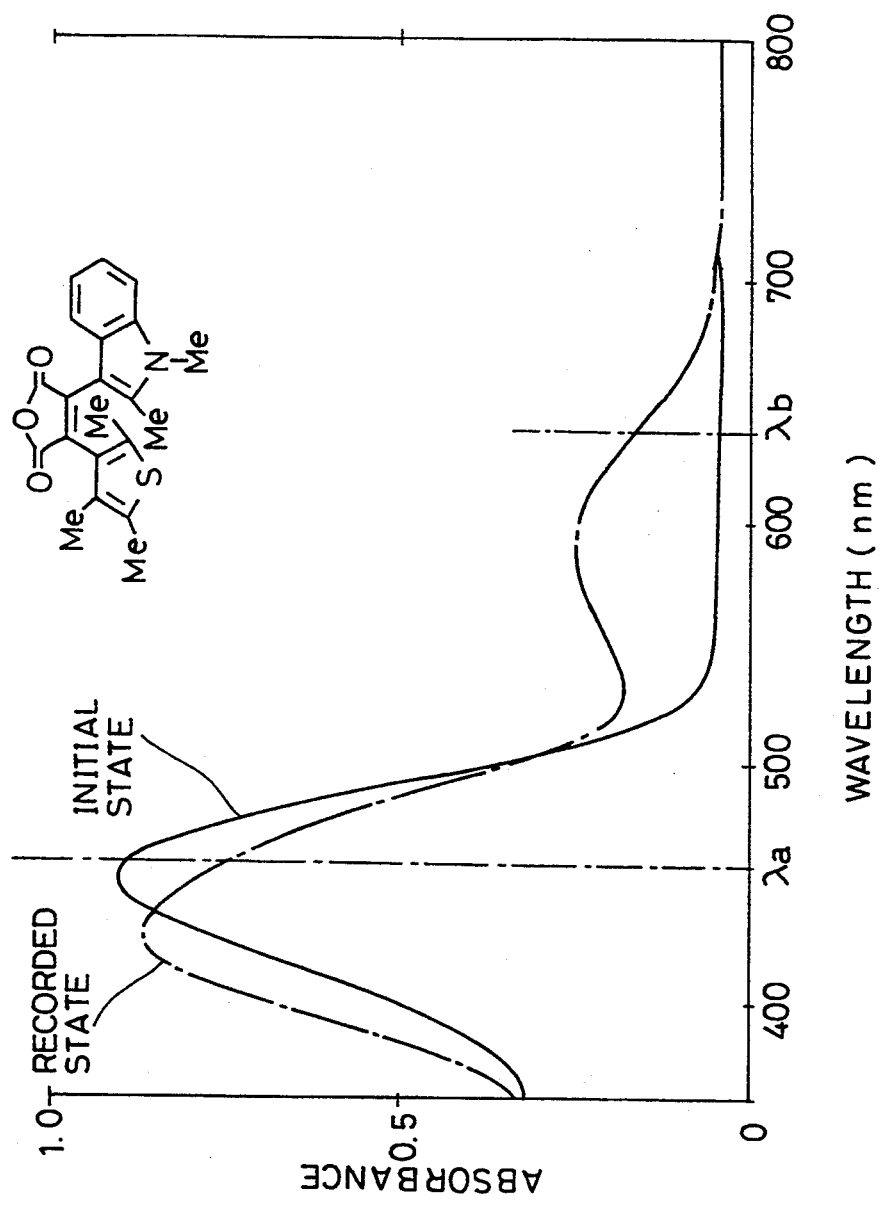
FIG. 29 is a graph showing light absorption characteristics of a photochromic material which can be used for an optical recording medium from which a reproduced signal with high C/N can be obtained.

Diaryl ethene derivative having the light absorption characteristics shown in FIG. 29, for example, can be used for a photochromic recording medium allowing noise reduction based on equation (7).

Realization of non-destructive reading is desired for a photochromic recording medium. A photochromic reaction, which is a photon mode reaction, has no threshold value. Therefore, even if a reading optical beam with power as low as possible is used, repetition of information reading enhances the photochromic reaction to ultimately loose recorded information. That is, the reproducing method of the above-described eighth embodiment has difficulty in non-destructive reading because the method utilizes light absorbance change.

According to the following ninth embodiment, recording is carried out by causing changes in birefringence and optical-rotatory power in a photochromic recording medium and non-destructive reading is performed by using an optical beam having a wavelength which is not absorbed by the photochromic material as a reading beam. In general, birefringence can be changed even in a wavelength range wherein no light is absorbed. As a result, irradiation of a photochromic recording medium with a reading beam in such a wavelength range results in its reflected light (or transmitted light) being affected by the birefringence, thereby changing its polarization state.

Figure 30A:
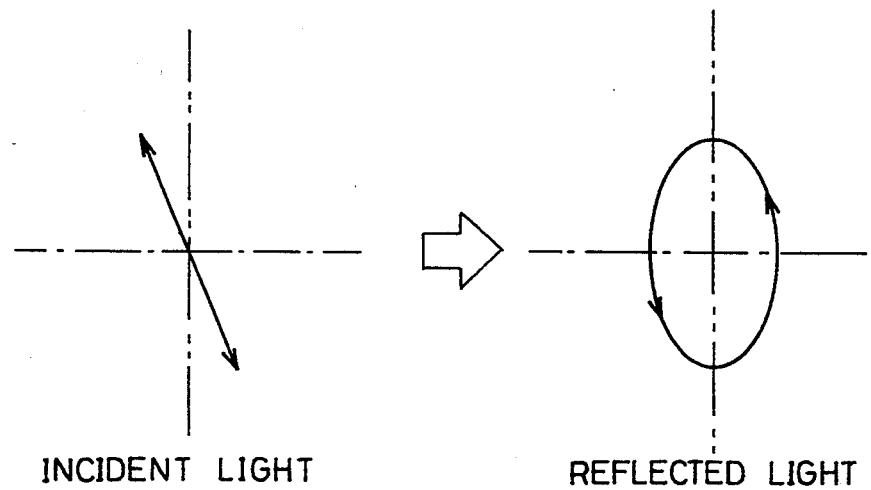
FIGS. 30A and 30B are diagrams respectively showing a polarization state of a reading beam incident on an optical recording medium and a polarization state of a reading beam reflected by the recording medium.

FIG. 30A shows a use-of a linearly polarized light having a polarization plane not coinciding with a neutral axis orientation of the birefringence of an optical recording medium as a reading beam, wherein a light reflected by the optical recording medium becomes an elliptically polarized light due to an effect of birefringence. An ellipticity and orientations of the major axis and the minor axis of the elliptical polarization of the reflected light are affected by the degree of the birefringence (i.e. recording information signal) of the recording layer, so that the previously described principle of noise reduction according to the eighth embodiment is not applicable to the reflected light. The principle of noise reduction according to the eighth embodiment is not simply applicable either to a case where a reading optical beam in other polarization states (circular polarization or elliptical polarization) is used.

Figure 30B:
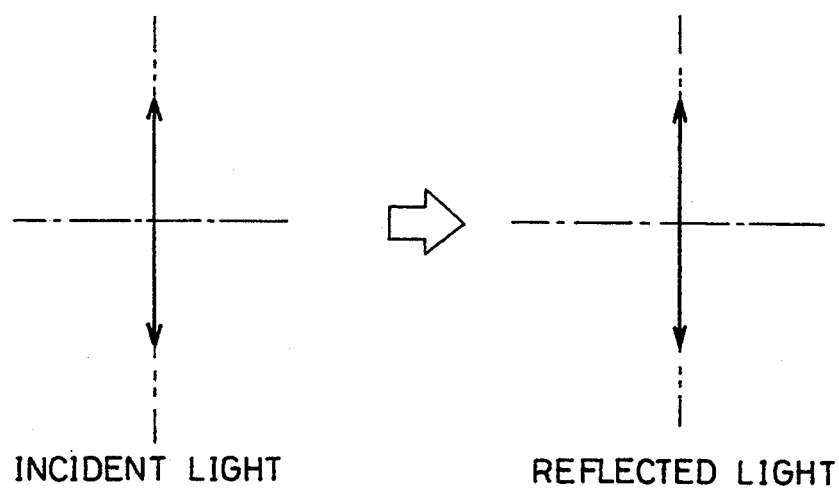

FIG. 30B shows a relationship between a linearly polarized reading beam which is a light in a wavelength range wherein a photochromic material absorbs no light and has a polarization plane coinciding with a neutral axis orientation of birefringence in the optical recording medium (a retarded phase axis in FIG. 30B) and a beam reflected by the optical recording medium. As can be seen from FIG. 30B, when the polarization plane of the reading beam is coincident with the neutral axis orientation of the birefringence, the reflected light, not being affected by birefringence, maintains the same polarization state as of the incident light, so that the principle of noise reduction according to the eighth embodiment can be employed.

Figure 31A:
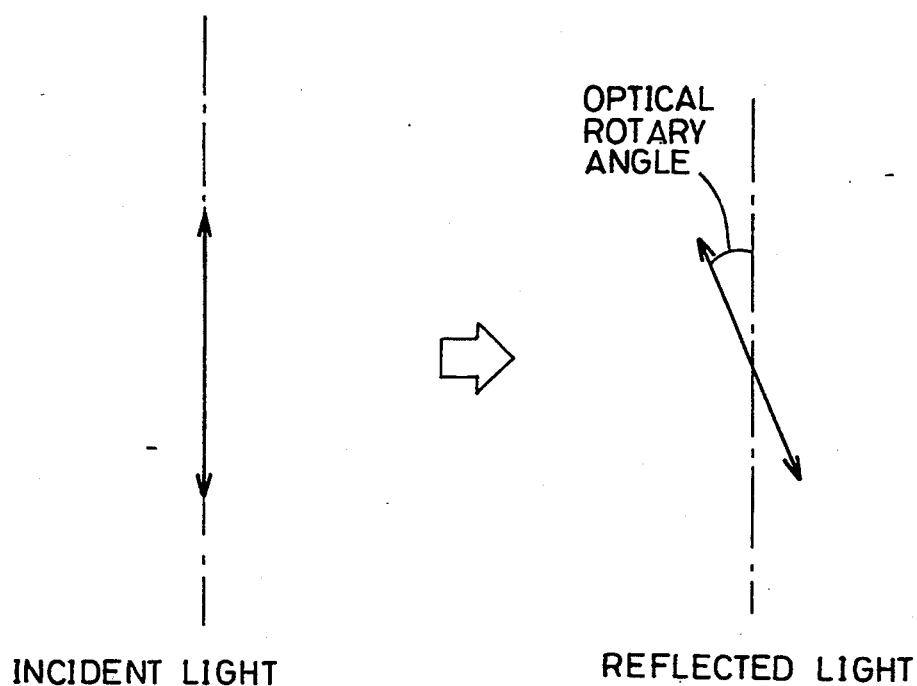
FIGS. 31A and 31B are diagrams respectively showing a polarization state of a reading beam incident on an optical recording medium and a polarization state of a reading beam reflected by the optical recording medium.
Figure 31B:
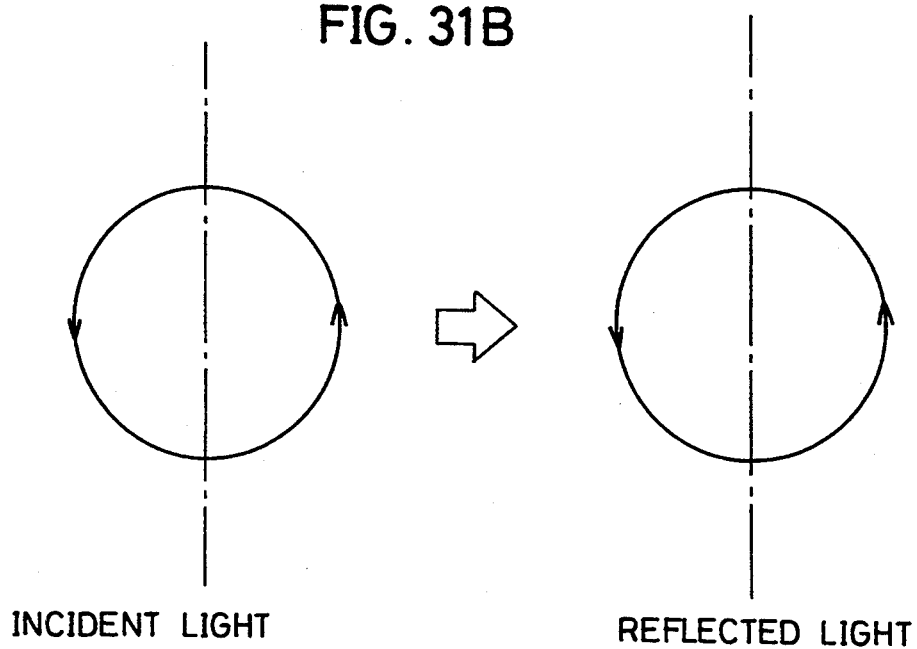

With reference to FIGS. 31A and 31B, description will be made of a non-destructive reading method for detecting a change in optical rotatory power of a photochromic recording layer. FIG. 31A shows a case where a linearly polarized light is used as a reading beam, wherein a light reflected by an optical recording medium is rotated in a polarization orientation because of optical rotatory power. In other words, the polarization state of the reflected light is affected by recorded information, which prevents the use of the noise reduction principle of the eighth embodiment. The use of an elliptically polarized reading optical beam does not also allow the simple use of the noise reduction principle according to the eighth embodiment.

FIG. 31B shows a relationship between a reading beam which is an optical beam in a wavelength range wherein a photochromic material absorbs no light and which is in circular polarization state, and a beam reflected by an optical recording medium. As can be seen from FIG. 31B, since the circularly polarized incident light is isotropic, even after its polarization orientation is rotated because of optical rotary power, polarization of the reflected light remains circular, thereby enabling the use of the noise reduction principle according to the eighth embodiment.

Figure 32:
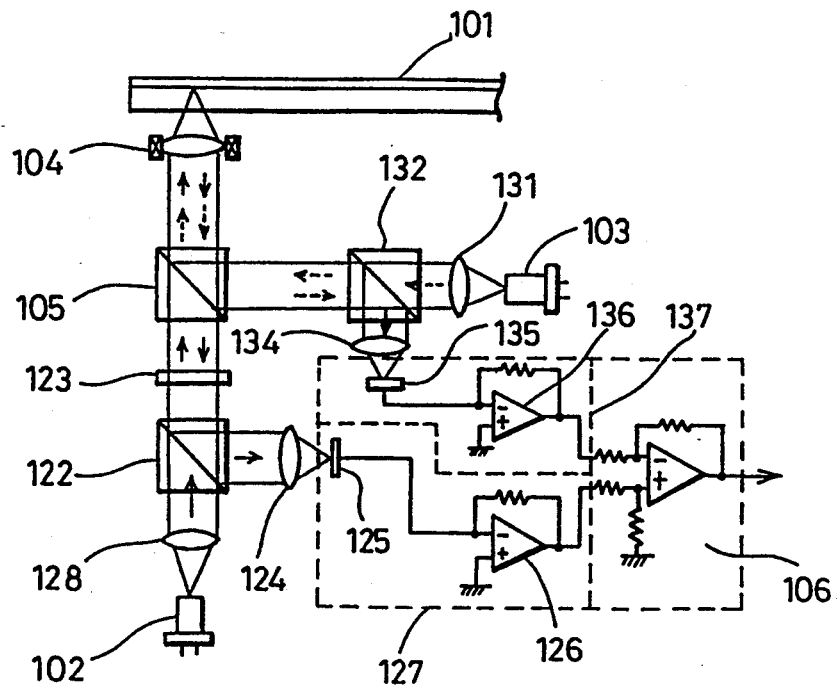
FIG. 32 is a diagram showing a reproducing device for use in a reproducing method utilizing a detection of a birefringe change.

FIG. 32 shows a reproducing device for use in a reproducing method using detection of a change in birefringence out of information reproducing methods according to a ninth embodiment. In FIG. 32, the same reference numerals are allotted to the same portions as those of the devices shown in FIGS. 26 to 28. The ninth embodiment allows a use of a recording medium with information written thereon by birefringence caused in a recording layer with irradiation of a linearly polarized recording beam and also allows a use of other similar optical reading media.

Many of photochromic materials absorb light in a visible light range and absorbs no light in a near infrared light range. It is therefore possible to use a semiconductor laser device 102 emitting a near infrared light having a wavelength $\lambda$ of 780 nm, for example, as a light source for a first reading beam. A light emitted from the light source 102 is converted into a parallel light by a collimator lens 128 and transmitted through a polarized beam splitter 122 as a P wave (a polarization orientation set to be 0°). Then, the first reading beam is converted into a linearly polarized light with an azimuth of +45° by a $\lambda/2$ wavelength plate 123, which linearly polarized light passes through a dichroic mirror 105 allowing transmission of a light with λ of 780 nm but reflecting a light with λ of 830 nm. Thereafter, the first reading beam is focused on a photochromic recording medium 101 by an objective lens 104.

Information is recorded on the photochromic recording medium 101 according to existence of birefringence with a neutral axis orientation of 0°. At a portion of the recording medium wherein birefringence exists, the linearly polarized light with azimuth of 45° is converted into an elliptically polarized light and reflected because of the effects of the portion and the linearly polarized light is reflected at a portion where no birefringence exists.

The reflected light is again transmitted through the objective lens 104 and the dichroic mirror 105 in a reverse direction and has its azimuth changed by the λ/2 phase plate 123. At this time, the optical beam directed onto the portion without having birefringence is returned to a linearly polarized light with azimuth of 0°, which is transmitted through the polarized beam splitter 122. Meanwhile, the optical beam directed onto the portion having no birefringence becomes an elliptically polarized light. The light has a polarization component at azimuth angle of 90° left even after its polarization direction is changed by the λ/2 phase plate 123, and has a remaining polarization component detected by a photodetector 125.

That is, the output of the detector 125 is changed according to existence of birefringence on the recording medium, thereby reproducing-information. In addition, an intensity of the reflected light is affected by the coarseness of the optical recording medium 101. Fluctuation of the intensity of the reflected light due to the surface coarseness is also detected by the detector 125 and turned into noise.

A second reading beam used for reducing noise will be described. The second beam also has a wavelength at which a photochromic material absorbs no light and such a light source as a semiconductor laser device 103 emitting a light with λ of 830 nm can be used. The light emitted from the light source 103, after being converted into a parallel light by a collimator lens 131, is transmitted through a beam splitter 132 and reflected by a dichroic mirror 105. Thereafter the second beam is focused on the same recording spot by the objective lens 104 as is irradiated with the first beam. At this time, the orientation of the light source 103 is adjusted in advance such that the polarization plane of the second beam coincides with the neutral axis orientation (in this case, θ=0°) of birefringence in the recording medium. The second beam is therefore reflected as a linearly polarized light even when the beam is directed onto the portion having birefringence on the recording medium and when the same is directed onto the portion having no birefringence.

After again passing through the objective lens 104 and the dichroic mirror 105 in a reverse direction, the reflected light is partly reflected by the beam splitter 132 to reach a detector 135. The amount of the light arriving at the detector 135 is independent of the existence of birefringence but dependent only on the coarseness of the surface of the recording medium. As a result, the output of the detector 135 includes a noise component only.

Output currents of the detectors 125 and 135 are converted into voltages by current/voltage (I/V) converting units 126 and 136, respectively, and then a differential amplifier system 106 performs operation processing (subtraction) thereof. At this time, the output voltages from the detection systems 126 and 136 should be appropriately amplified or attenuated in order to efficiently reduce a noise component, which can be achieved by adequately selecting a resistance value of a resistor used in the differential amplifier system 106.

Figure 33:
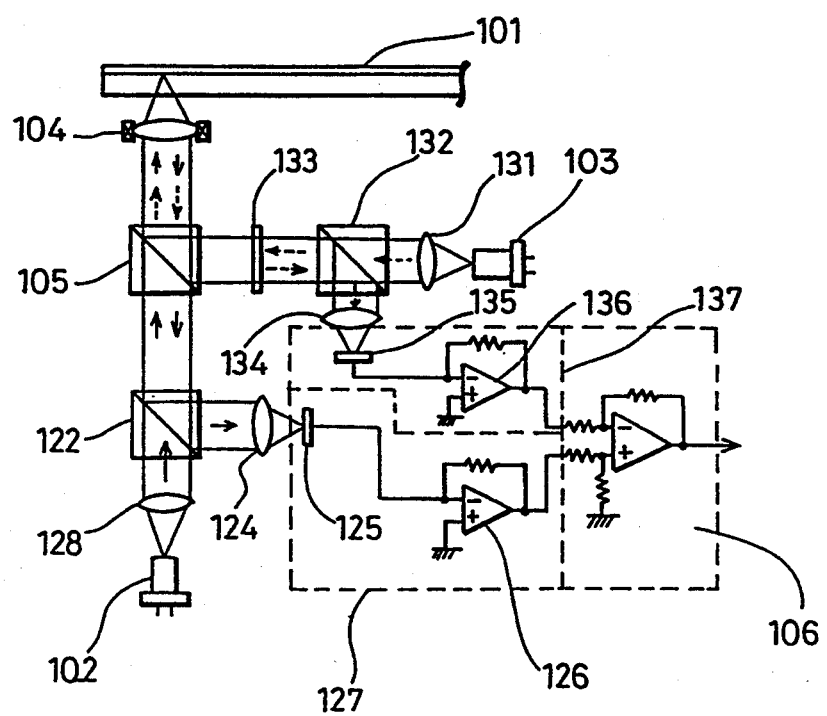
FIG. 33 is a diagram showing a reproducing device for use in a reproducing method utilizing a detection of an optical rotatory power change.

FIG. 33 shows a reproducing device for use in a reproducing method utilizing a detection of a change in optical rotatory power. In this device, the same reference numerals are allotted to the same portions as those of the devices shown in FIGS. 26, 27, 28 and 32. For the embodiment of FIG. 33, a recording medium including a recording layer with photochromic compounds scattered in twist nematic liquid crystal can be used and other similar optical recording media can be also used.

A first reading beam for reproducing information will be described first. Unlike the device of FIG. 32, the reproducing device of FIG. 33 does not include the λ/2 phase plate 123. That is, the first reading beam is directed on the recording medium 101 as a linearly polarized light. Then, a light reflected by the recording medium has its polarization plane rotated or unrotated depending on existence of optical rotatory power corresponding to the recorded information. The amount of light reflected by the polarized beam splitter 122 is changed according to existence of optical rotatory power, which change of the light amount is detected by the detector 125 and turned into a reproduced signal output including reproduced information and medium noise.

A second reading beam used for reducing noise will be described. The second beam is transmitted through the polarized beam splitter 132 as a P wave and converted into a circularly polarized light by a λ/4 phase plate 133. As a result, the circularly polarized second beam is reflected by the recording medium without being affected by existence of optical rotatory power and again converted into a S polarized light by the λ/4 phase plate 133. The S polarized light is reflected by the polarized beam splitter 132 and detected by the detector 135. As a result, the detector 135 obtains an output including only a medium noise component.

Thereafter, reproduced information with reduced noise is obtained through the I/V converting units 126 and 136 and the differential amplifier 106 as in the device of FIG. 32.

If the second beam attains a polarization state considerably different from circular polarization due to a phase difference generated when the second beam is reflected by the dichroic mirror 105, a phase difference compensating plate should be provided between the dichroic mirror 105 and the λ/4 phase plate 133.

Although the above ninth embodiment is directed to reproducing information recorded on an optical recording medium, which information is recorded by utilizing existence of birefringence or optical rotatory power, it will be understood that the present invention is also applicable to reproduction of information from a recording medium which information recorded by utilizing the degree of such properties.

Figure 34A:
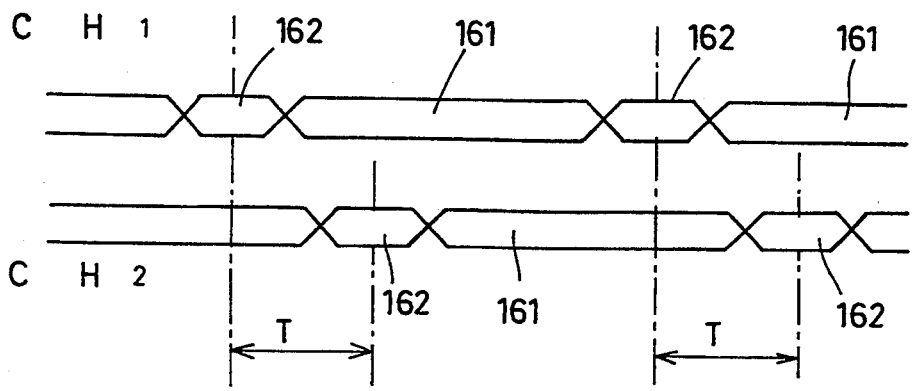
FIGS. 34A, 34B and 34C are diagrams illustrating the principle to be applied to a tenth embodiment.
Figure 34B:
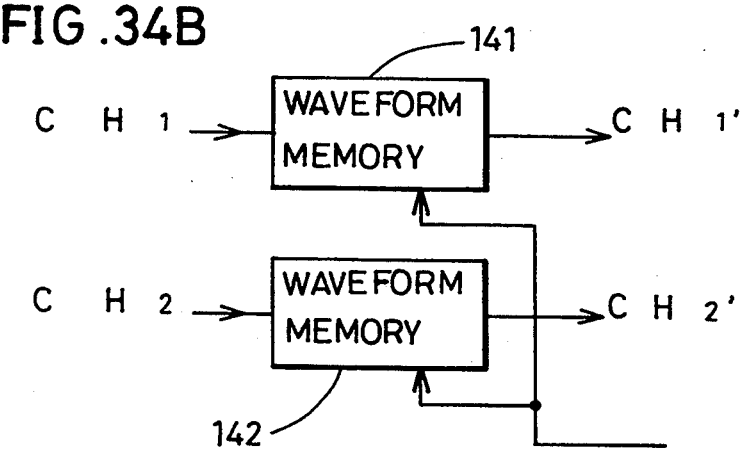
Figure 34C:
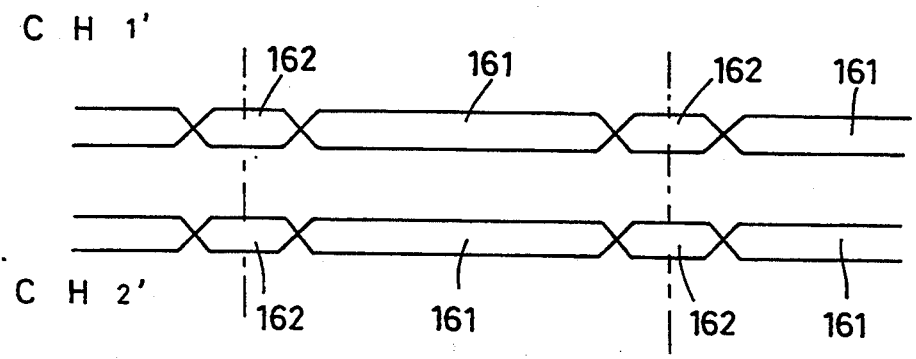

With reference to FIGS. 34A, 34B and 34C, the principle to be applied to a tenth embodiment will be described. These figures illustrate a method of reading detected signals separately detected by the first and the second optical beams and stored in a storage unit, in response to a synchronization signal. For the purpose of simplicity of description, it is assumed that a detection system includes two channels CH1 and CH2 only. Such a detection system can be used for reducing noise of a reproduced signal and increasing a signal level or reproducing wavelength-multiplex recorded information. For reducing noise and increasing a level of a signal, both of the detected signals should include a synchronization signal. When the detection system is used for reproducing wavelength-multiplex recorded information, synchronization signals respectively corresponding to multiplex-recorded information signals should be recorded at the same portion of the recording medium.

In FIG. 34A, each information signal (detected signal) 161 is stored in a memory so as to be interposed between two synchronization signals 162. If two beams spots one for the channel CH1 and the other for channel CH2 are on the same track but focused on different recording spots, a time difference is generated between detected signals on the channels CH1 and CH2 depending on a distance between these spots and a rotation speed of the recording disk.

FIG. 34B is a block diagram showing a processing device of a detected signal. Detected signals on the channels CH1 and CH2, in the form of an information signal superimposed between two synchronization signals as one unit, are once stored in waveform memories 41 and 42 and then detected signals corresponding to the channels CH1 and CH2 are simultaneously read in response to an external memory reading synchronization signal as trigger.

Therefore, no time difference T exists between the read signals CH1' and CH2' as shown in FIG. 34C.

Each of the memories 41 and 42 is required to have a capacity of storing plural units of information signals according to a time difference T.

Operation processings can be made on the read signals CH1' and CH2' in order to reduce noise, increase a level of a signal and reduce cross-talk at the time of reproducing multiplex recorded information.

Figure 35A:
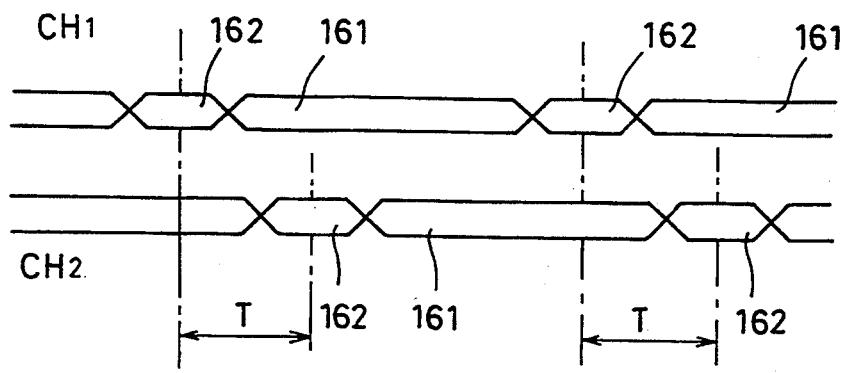
FIGS. 35A, 35B and 35C are diagrams illustrating a method of reading detected signals on two channels in synchronization with each other.
Figure 35B:
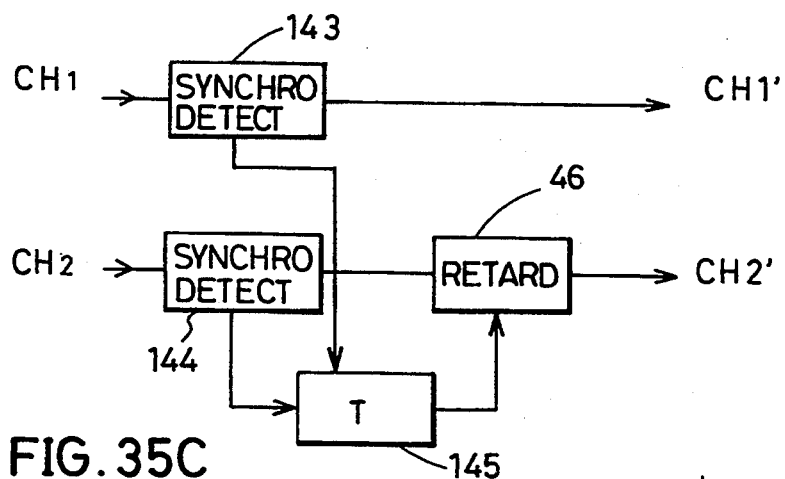
Figure 35C:
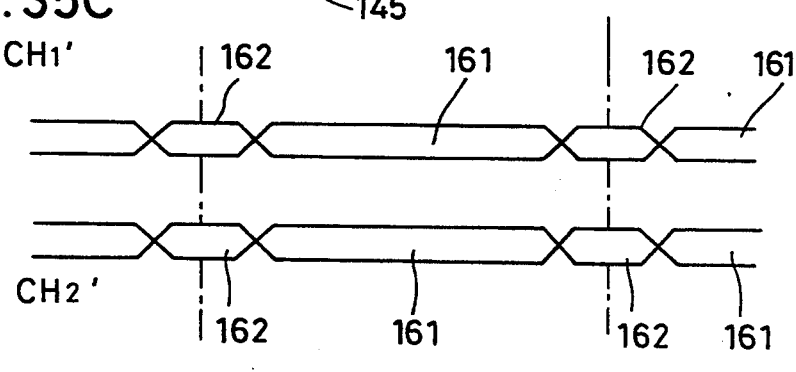

FIGS. 35A and 35B and 35C illustrate a method of reading detected signals on two channels in synchronization with each other by delaying one detected signal on one channel according to a time different T. Herein, description on FIG. 35A will be omitted because it is the same as FIG. 34A.

FIG. 35B is a block diagram showing a device for processing such detected signals as shown in FIG. 35A. Timing of synchronization signals is detected by synchronization signal detection units 43 and 44 from signals on the channels CH1 and CH2 (assuming that the signal on the channel CH2 has a delay with respect to that on CH1). The detected synchronization signals are compared by a unit 45 for obtaining time difference T and the amount of the delay corresponding to the time difference T is applied to the signal on the channel CH2 by a delay unit 46. Various methods can be employed for delaying the signal on the channel CH2. For example, a possible method includes the steps of once storing a signal in a waveform memory, delaying the signal by a delay time T and reading the delayed signal as in the example of FIG. 34B. Thus delayed detection signals CH2' and CH1' have no time difference therebetween as shown in FIG. 35C. Operation processing can be made on these signals CH1' and CH2' to reduce noise, increase a level of a signal and reduce cross-talk at the time of reproducing wavelength-multiplex recorded information.

Figure 36:
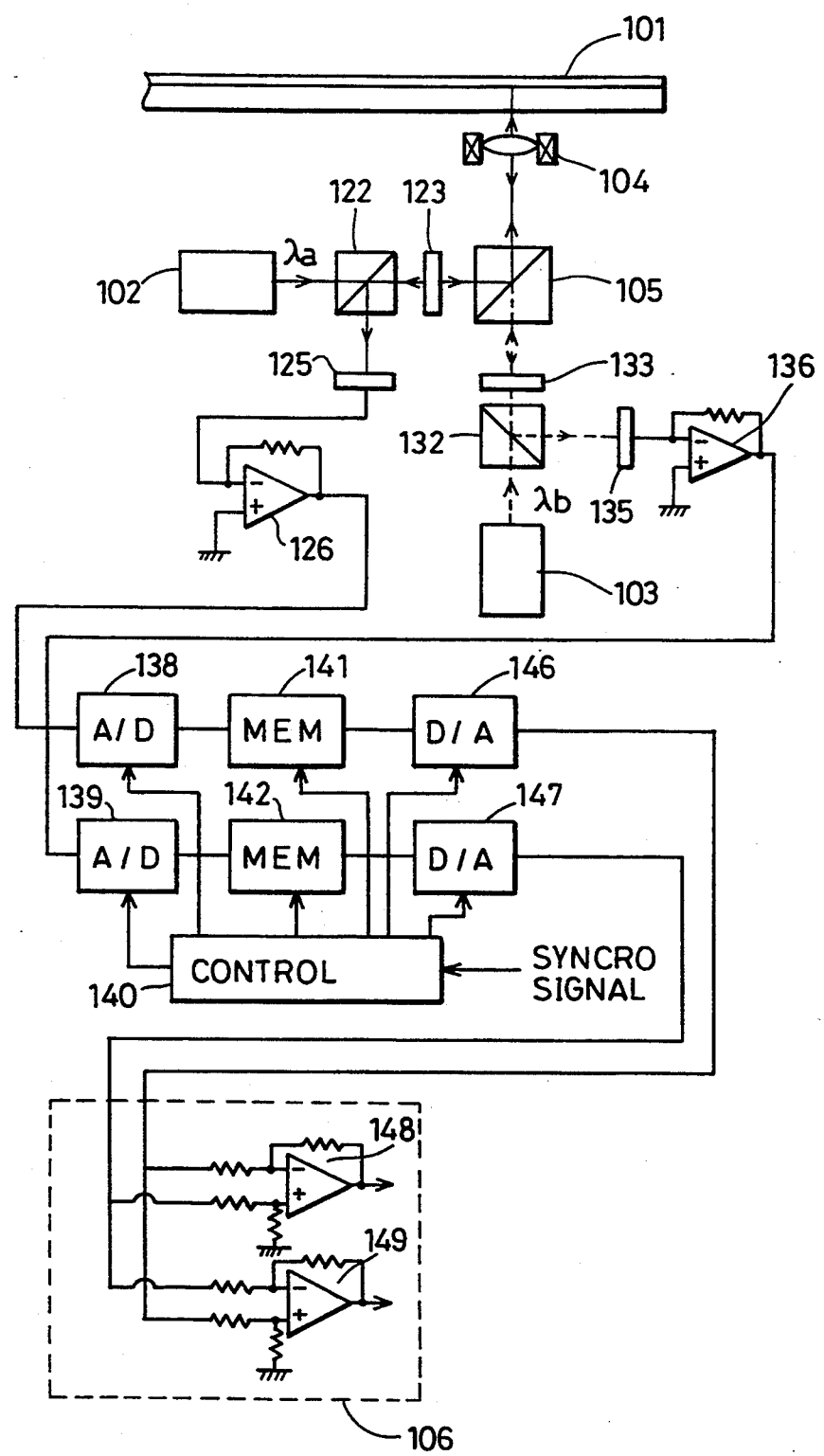
FIG. 36 is a diagram showing a device for reproducing wavelength-multiplex-recorded information.
Figure 37A:
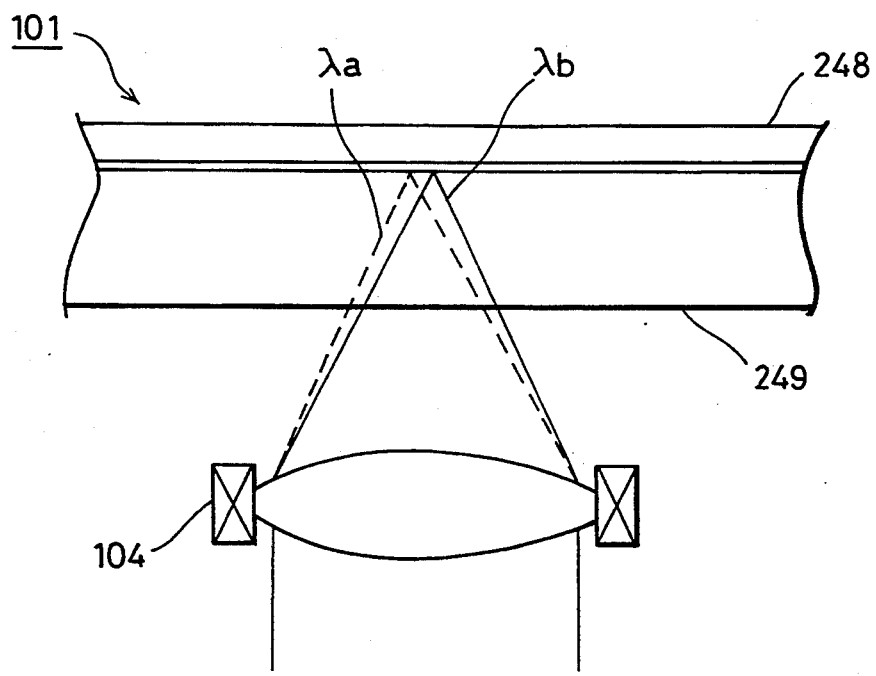
FIGS. 37A and 37B are diagrams showing a state where two optical beams are focused on different recording spots along the same track on a recording medium.
Figure 37B:
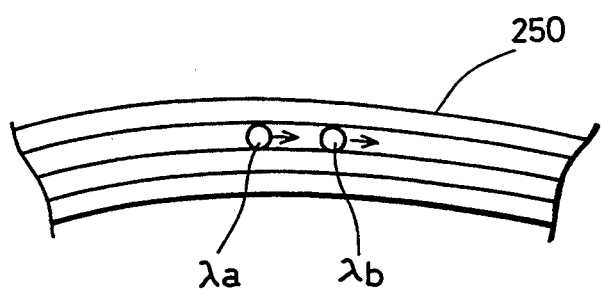

FIG. 36 illustrates a reproducing device for reading wavelength-multiplex-recorded information, which device employs a detection signal reading method (the examples shown in FIGS. 34A to 34C) according to the present invention. In the reproducing device, the same reference numerals are allotted to components having the same functions as those of the devices according to the eighth and the ninth embodiments. FIGS. 37A and 37B illustrate two optical beams one having a wavelength $\lambda_b$ and the other having $\lambda_a$ are focused on different recording spots along the same track of a recording medium 101 by an objective lens system 104. In these figures, recording tracks 250 are formed on a concentric circle in a recording layer 248 on a substrate 249.

In FIG. 36, the beams with a wavelength $\lambda_a$ and $\lambda_b$ are emitted from light sources 102 and 103, respectively, with constant power and these two beams are combined into one beam by a dichroic mirror 105. The combined beam is focused on the same track 250 on the recording medium 101 by an objective lens system 104.

The light reflected by the recording medium 101 again passes through the objective lens system 104 in a reverse direction and is separated into two beams by the dichroic mirror 105. The two beams arrive at photodetectors 125 and 135 through $\lambda/4$ wavelength plates 123 and 133 and polarized beam splitters 122 and 132, respectively. Output currents from the photodetectors 125 and 135 are converted into voltages by I/V converting units 126 and 136, respectively, to obtain detected signals including cross-talk.

Then, these detected signals are converted into digital signals by A/D converting units 138 and 139 and once stored in waveform memory units 141 and 142, respectively. The stored signals are read as synchronized signals by the memory units 141 and 142, respectively, in response to an external synchronization signal. The read digital signals are returned to analog signals by D/A converting units 146 and 147. For these analog signals, a deferential amplifier system 106 including two differential amplifiers 148 and 149 perform predetermined operation processing in order to reduce cross-talk. The A/D converting units 138 and 139, the memory units 141 and 142 and the D/A converting units 146 and 147 are controlled by a control circuit 140.

Figure 38:
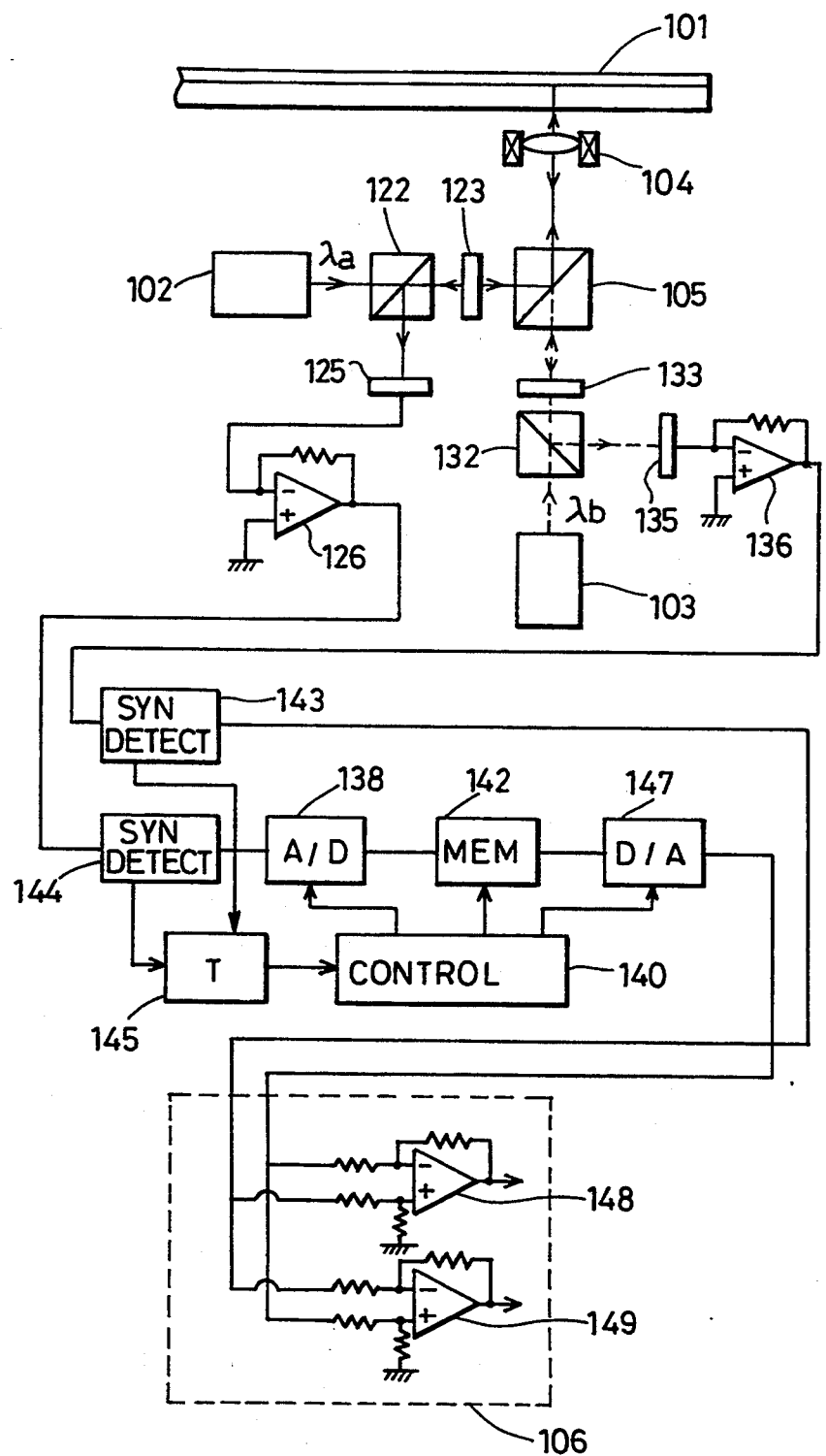
FIG. 38 is a diagram showing a reproducing device allowing operation for reducing noise by delaying one of two detected signals.

By modifying the differential amplifier system 106, the device of FIG. 36 is applicable as a reproducing device enabling reduction of noise and increase of a signal level other than reduction of cross-talk. That is, in any case, provision of the waveform memory units 141 and 142 enables synchronization of detected signals obtained by the photodetectors 125 and 135 and the I/V converting units 126 and 136, before a predetermined operation is performed. Furthermore, a method of delaying one detected signal according to a time difference T (the examples of FIGS. 35A to 35C) can be also employed by such a reproducing device as shown in FIG. 38. This device is provided with synchronization signal detecting units 143 and 144 and a unit 145 for determining time difference T, wherein the control circuit 140 delays one of detected signals by a time difference T.

Figure 39A:
FIGS. 39A to 39F are waveform diagrams illustrating a method of reducing noise in a reproducing signal.
Figure 39B:
Figure 39C:

As described in the foregoing, the first detected signal obtained by the first reading beam includes both of an information signal component and a medium noise component, while the second detected signal obtained by the second reading beam includes only a medium noise component in the eighth to tenth embodiments. A noise component therefore can be effectively reduced by finding a difference between the first and the second detected signals. FIGS. 39A to 39F schematically show such noise reduction. When a modulation degree of a recording medium (a difference between reflectances of a non-recorded portion and a recorded-portion) is low, subtraction of such a first detected signal obtained by a first beam as shown in FIG. 39A from such a second detected signal obtained by a second beam as shown in FIG. 39B obtains a reproduced output signal with noise effectively reduced as shown in FIG. 39C.

Figure 39D:
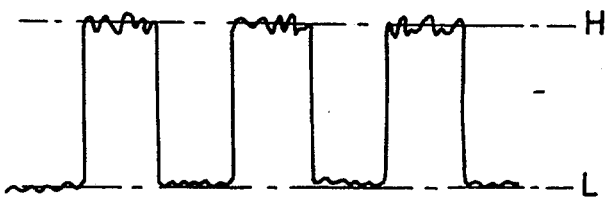
Figure 39E:
Figure 39F:
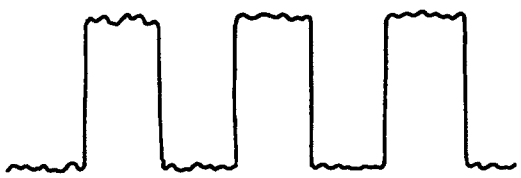

However, with a high modulation degree of the recording medium as shown in FIG. 39D, when the first reading beam is reflected by a portion having a high reflectance, an absolute value of the output of a photodetector is increased and a noise amplitude is also increased as shown in proximity to a high level. On the other hand, when the first beam is reflected by a portion having a low reflectance, the absolute value of the output of the photodetector is reduced and the noise amplitude is also reduced as shown in proximity to a low level. When the second reading beam is reflected, an amplitude of noise included in a second detected signal is always constant as shown in FIG. 39E. It is therefore impossible to completely remove noise only by simply subtracting the signal of FIG. 39E from the signal of FIG. 39D.

In view of such problems, the following eleventh embodiment relates to a method of effectively reducing medium noise even when a modulation degree of a recording medium is high or when an amplitude level of a reproduced information signal is continuously changed.

Figure 40A:
FIGS. 40A to 40D are waveform diagrams illustrating a noise reducing method to be applied to an eleventh embodiment.
Figure 40B:
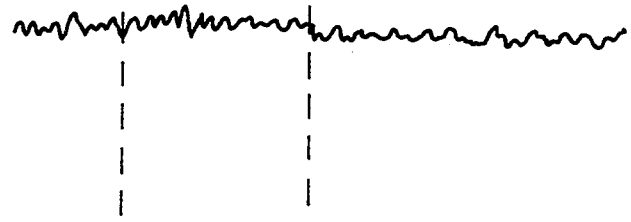
Figure 40C:
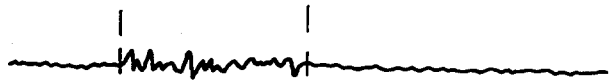
Figure 40D:
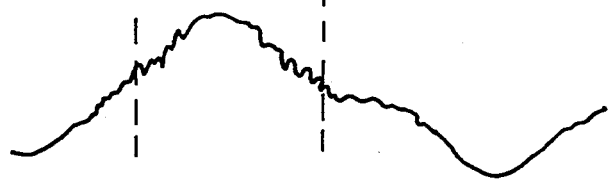

That is, a first detected signal includes noise with an amplitude fluctuating depending on a reflection intensity of a first optical beam as shown in FIG. 40A. A second detected signal includes only a noise component with a fixed amplitude corresponding to a substantially fixed reflection intensity of a second optical beam as shown in FIG. 40B. In such a case, a reproduced information signal with noise effectively reduced as shown in FIG. 40D can be obtained by changing the amplitude of the noise included in the second detected signal of FIG. 40B to be an amplitude as shown in FIG. 40C so as to correspond to the amplitude of the noise included in the first detected signal of FIG. 40A and subtracting the noise signal of FIG. 40C from the first detected signal of FIG. 40A.

The following is a description of a method of reducing medium noise, which is an application of this principle. A first detected signal voltage V1 including an information signal (represented as a single angular frequency $\omega$ in this case, for the purpose of simplicity) and medium noise will be expressed by equation (8).

$$V1 = \alpha \cdot P(R + \delta R)(1 + M\cos\omega t) \quad (8)$$
$$= \alpha PR(1 + M\cos t) + \alpha P \cdot \delta R(1 + M\cos\omega t)$$

Herein, $\alpha$ denotes a proportional constant relating to a gain of a preamplifier, pick-up efficiency and detector efficiency, P denotes power of a laser beam on the surface of a recording medium, R denotes an average reflectance, M denotes a modulation degree and $\delta R$, a fluctuation part of R, denotes medium noise. That is, the second term on the right side of equation (8) represents a medium noise component, showing that the amplitude of the medium noise is changed depending on an information signal.

Ordinarily, the output V1 is changed into V1' expressed by expression (9) because its low frequency component $\alpha PR$ for use in various servo circuits is cut.

$$V1' = \alpha P \cdot RM \cos \omega t + \alpha P \cdot \delta R(1 + M \cos \omega t) \quad (9)$$

The second detected signal voltage V2 including only medium noise will be expressed by equation (10).

$$V2 = \beta P'(R + \delta R) \quad (10)$$

Herein, $\beta$ is proportional constant like $\alpha$ and P' represents power of a laser beam at the surface of the recording medium. Similarly to V1, V2 is changed into V2' expressed by equation (11) because its low frequency component is cut.

$$V2' = \beta P' \cdot \delta R \quad (11)$$

Herein, consideration is given to an operation of finding a product of a signal obtained by adding an offset voltage equivalent to a reflectance of a recording medium to a first detected signal including a reproduced information signal component, and a second detected signal including only a noise component, and subtracting a signal obtained by appropriately amplifying or attenuating the product signal from the first detected signal. V1 of equation (8) is restored by adding an offset voltage (DC) equivalent to an average reflectance of the medium to the first detected signal V1' of equation (9). Thus restored V1 of equation (8) is multiplied by the second detected signal V2' of equation (11) to obtain a signal V3 expressed by equation (12).

$$V3 = \gamma \{\beta P' \cdot \delta R \cdot \alpha P \cdot R(1 + M\cos\omega t) + \beta P' \cdot \alpha P(\delta R)^2 (1 + M\cos\omega t)\} \quad (12)$$

Herein, $\gamma$ denotes a proportional constant.

V4 of equation (13) is obtained by the signal V3. V4 is ultimately expressed as equation (14).

$$V4 = V1' - V3/(\gamma \cdot \beta P' \cdot R) \quad (13)$$
$$V4 = \alpha P \cdot R \cdot M\cos\omega t - \alpha \cdot P(\delta R)^2 \cdot R \cdot (1 + M\cos\omega t) \quad (14)$$

The first term on the right side of equation (14) represents an information signal component and the second term represents a medium noise component. While in equation (9), the second term corresponds to a primary term of $\delta R$, the second term of equation (14) corresponds to a secondary term of $\delta R$. In consideration of a fact that $\delta R$ is considerably smaller than an information signal component in general, the square of $\delta R$ is smaller enough to be negligible than the information signal component. It is therefore clear that C/N is improved by the operation for obtaining equation (14).

Figure 41:
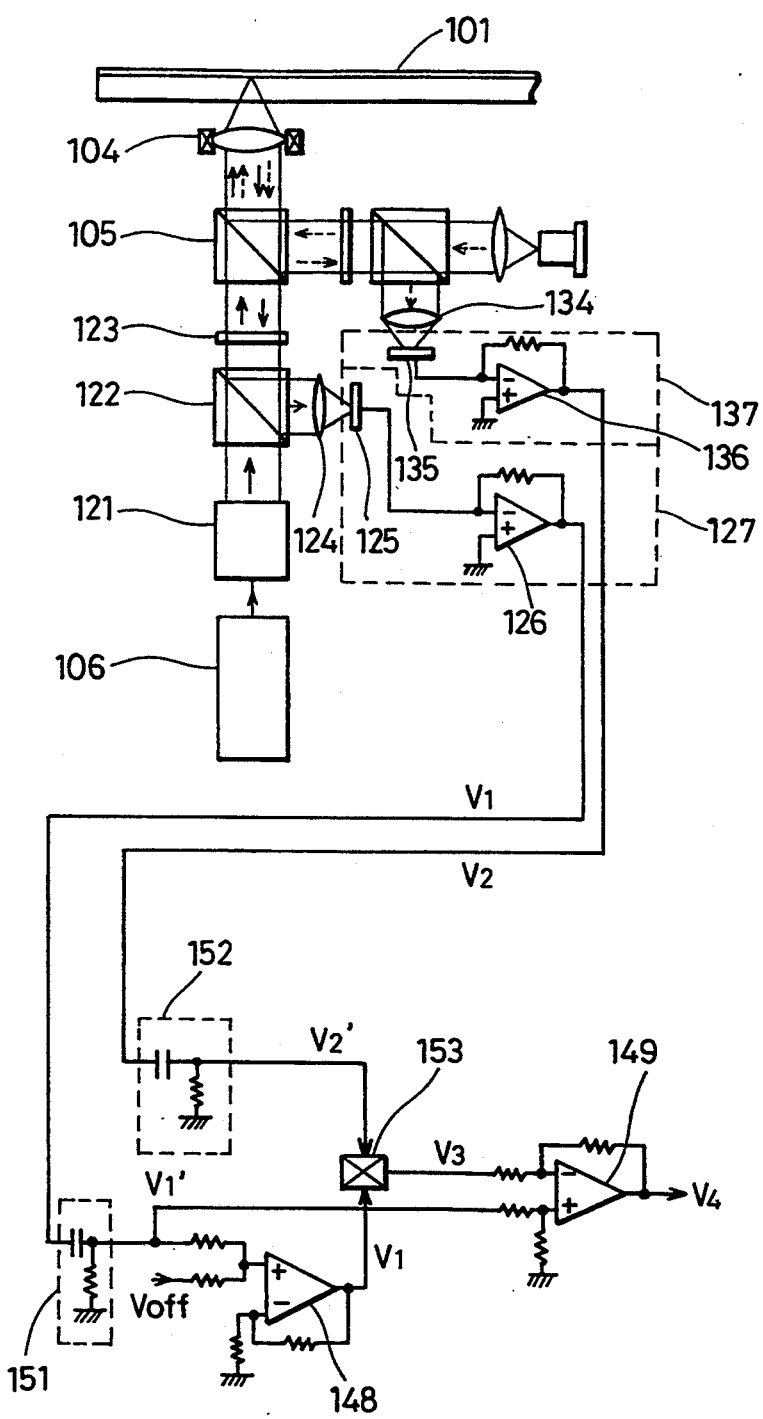
FIG. 41 is a diagram showing a reproducing device according to the eleventh embodiment.

FIG. 41 shows a reproducing device capable of performing the operation for obtaining equation (14). In the device of FIG. 41, the same reference numerals are allotted to components having the same function as those of the devices according to the eight to tenth embodiments. In this device, a first detected signal V1 including an information signal and noise is output from a first detection channel 127, and a second detected signal V2 including noise only is output from a second detected channel 137.

High pass filters 151 and 152 cut a low frequency component to separate a low frequency component for servo. A first detected signal V1' after passing through the filter 151 is supplied with an offset voltage Voff by a differential amplifier 148 to be returned to V1. The V1 is multiplied by a second detected signal V2' in a multiplication circuit 153 to obtain an output equivalent to a signal V3 of equation (12). By subtracting, in a differential amplifier unit 149, a signal obtained by appropriately amplifying or attenuating the signal V3 from the first detected signal V1', and reproduced output signal V4 of equation (14) with reduced noise can be obtained.

Other various operation methods can be used for reducing noise. For example, a signal obtained by appropriately amplifying or attenuating a second detected signal including only a noise component is subtracted from a first detected signal including a reproduced information signal. By again subtracting, from the first detected signal, a signal obtained by appropriately amplifying or attenuating a product of the difference signal and the second detected signal, a reproduced information signal with reduced noise can be obtained. In this operation, by subtracting a signal obtained by appropriately amplifying or attenuating the second detected signal V2' of equation (11) from the first detected signal V1' of equation (9), a noise part independent of an information signal is removed as shown by equation (15).

$$V3' = V1' - \alpha P/\beta P \cdot V2' \quad (15)$$
$$= \alpha P \cdot R \cdot M\cos\omega t + \alpha P \cdot \delta R \cdot M\cos\omega t$$

V4', which is a product of V3' and the second signal V2' will be expressed by equation (16).

$$V4' = \gamma \beta P \cdot \delta R \cdot \alpha P \cdot RM\cos\omega t + \delta \beta P \cdot \alpha P (\delta R)^2 M\cos\omega t \quad (16)$$

Equation (17) is obtained by subtracting, from equation (15), a signal obtained by again amplifying or attenuating V4'.

$$V5 = V3' - V4'/\gamma \beta P \cdot R \quad (17)$$
$$= \alpha P \cdot R \cdot M\cos\omega t - \alpha P (\delta R)^2/R \cdot M\cos\omega t$$

In equation (17), the first term on the right side represents an information signal component and the second term represents a medium noise component. As in equation (14), the second term of equation (17) corresponds to a secondary term of $\delta R$, which shows that C/N is improved.

Figure 42:
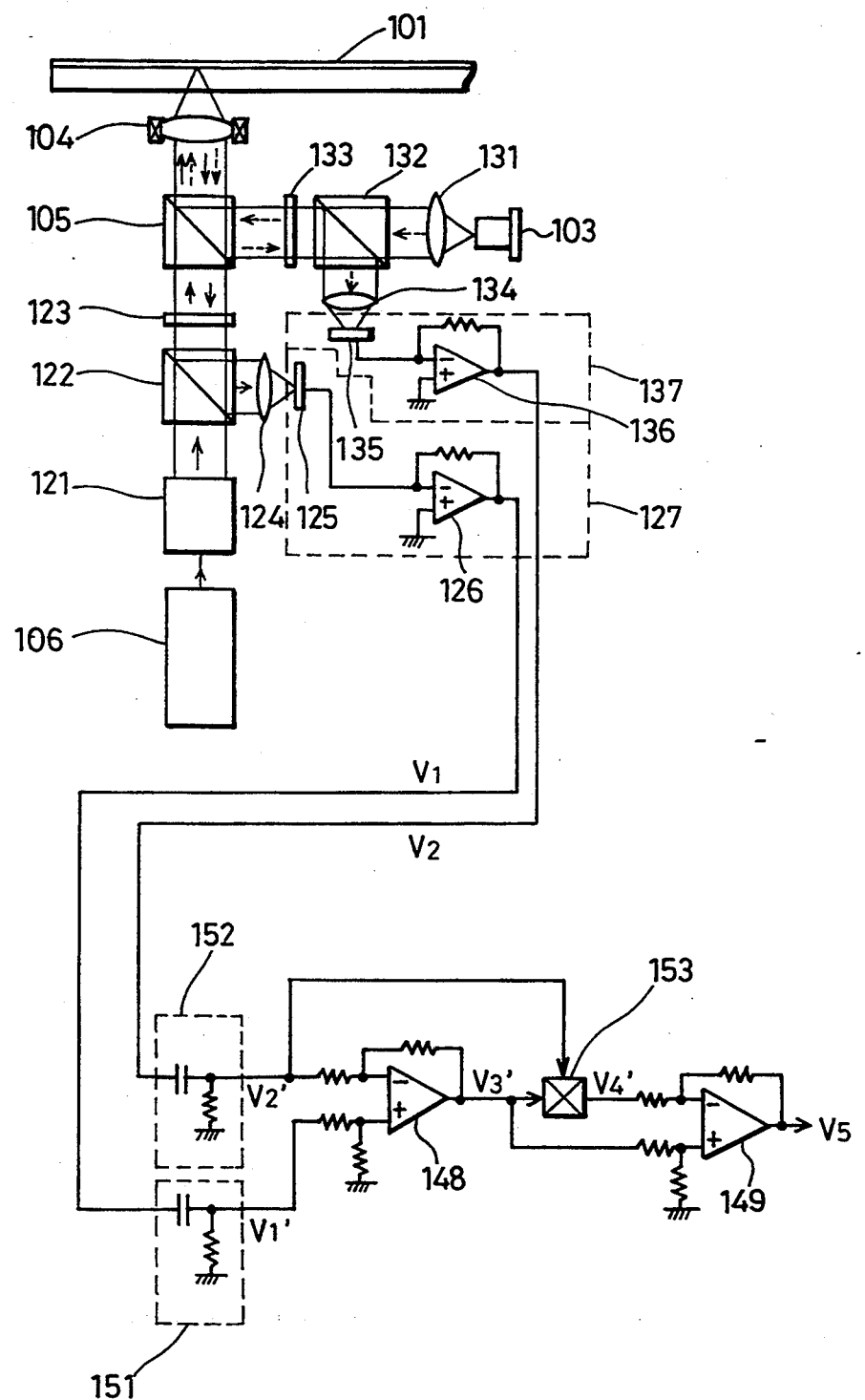
FIGS. 42, 43 and 44 are diagrams each showing an example of a reproducing device obtained by partly modifying the reproducing device of FIG. 41.

FIG. 42 shows a reproducing device capable of performing an operation for obtaining equation (17). In this device, the same reference numerals are allotted to components having the same functions as those in FIG. 41. The device of FIG. 42 is the same as that of FIG. 41 with a difference in that input/outputs of the differential amplifiers 148, 149 and the multiplication circuit unit 153 are different from those in FIG. 41 and therefore no detailed description will be made of the device of FIG. 42.

It will be now considered that the operations (8) to (14) are applied to a circuit for reducing light source noise. Also in this case, a first detected signal output V11 including light source noise will be expressed as equation (18) similar to V1 of equation (8).

$$V11 = \alpha (P + \delta P) R (1 + M\cos\omega t) \quad (18)$$
$$= \alpha PR (1 + M\cos\omega t) + \alpha \cdot \delta P \cdot R (1 + M\cos\omega t)$$

Herein $\delta P$ represents light source noise caused by a fluctuation of laser power.

A second detected signal output V12 including only light source noise will be expressed by equation (19).

$$V12 = \beta(P + \delta P) \quad (19)$$

Comparisons between equations (18) and (8), and between equation (19) and equation (10) show that a term depending on a fluctuation of laser power and a term depending on a fluctuation of a reflectance are expressed in completely the same form, apart from a proportional constant. It will be understood that light source noise can be reduced by the same operation method as the previously described operation method for reducing noise.

Figure 43:
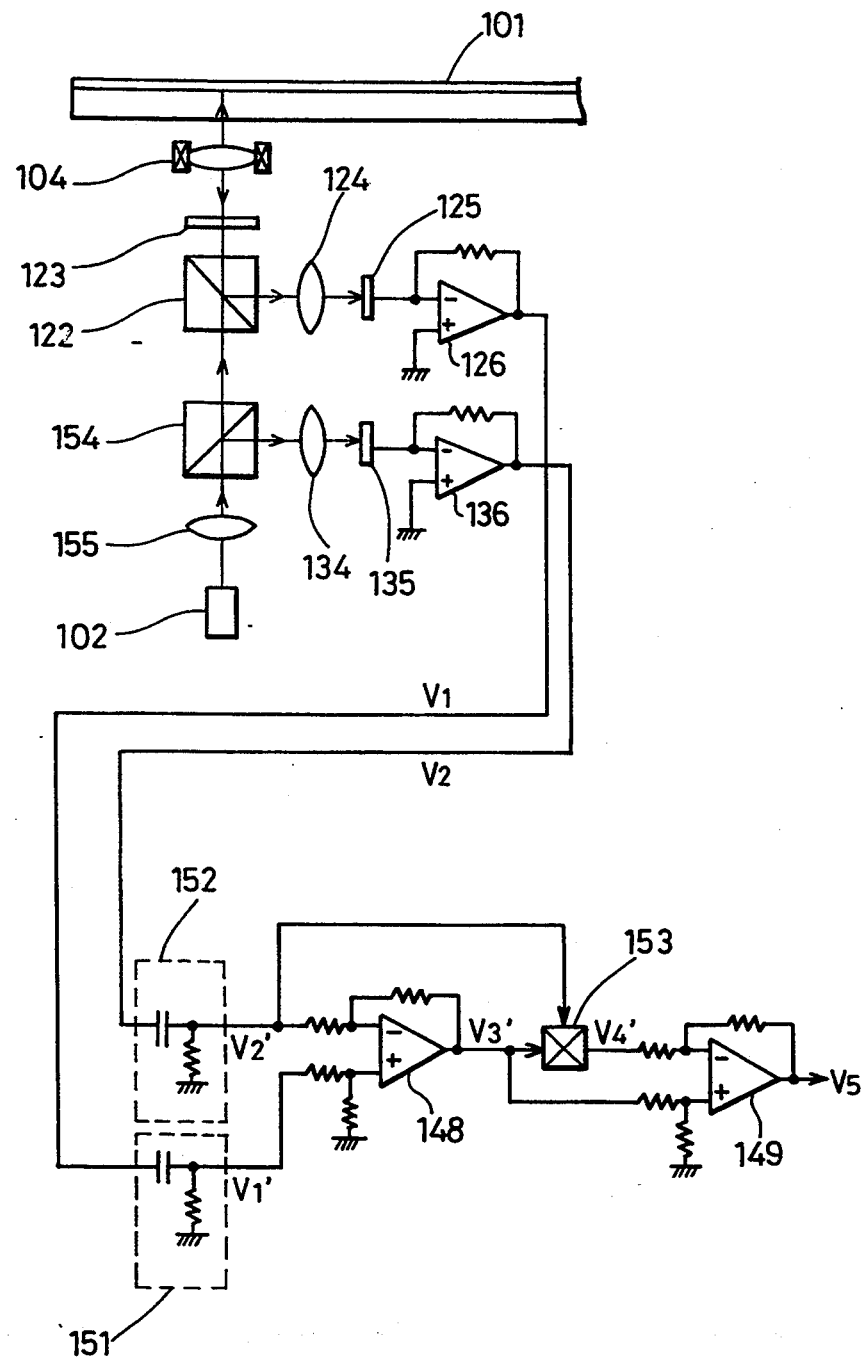
Figure 44:
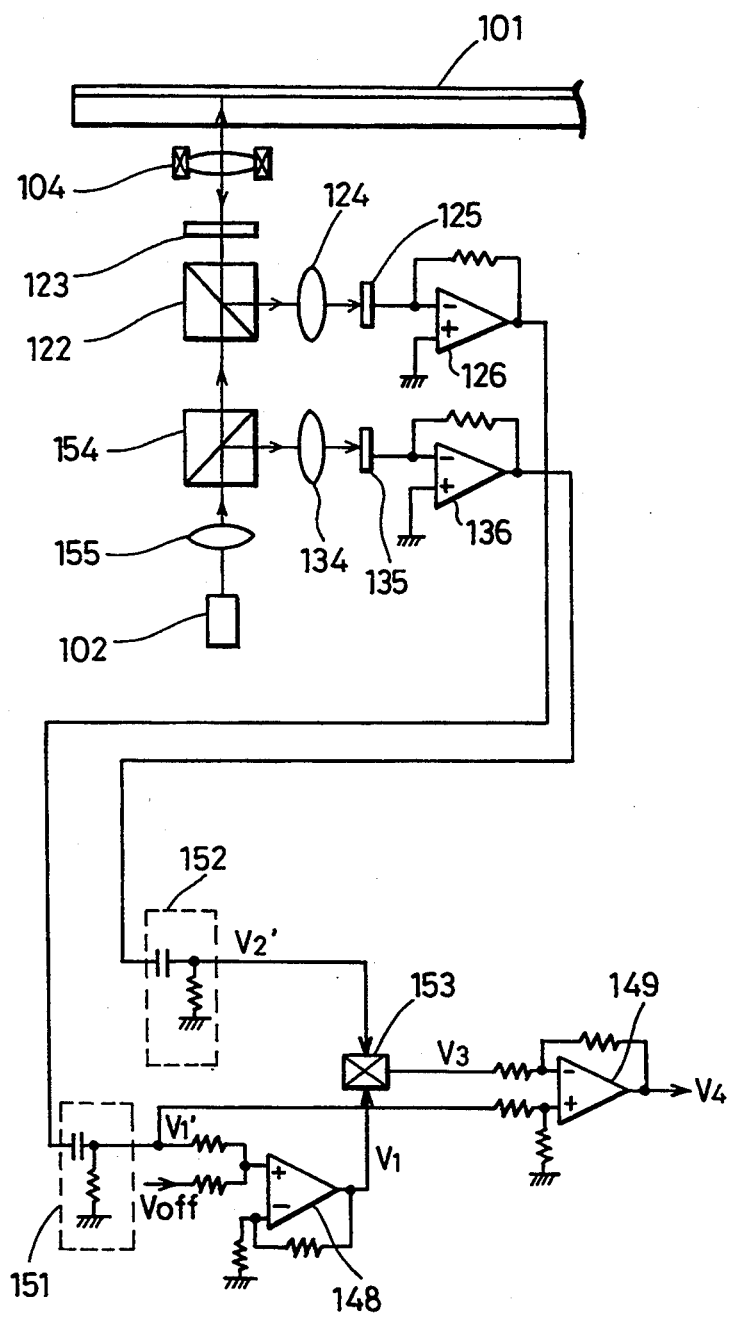

FIGS. 43 and 44 illustrate two reproducing devices enabling reduction of light source noise by using equations (18) and (19), wherein the same reference numerals are allotted to components having the same functions as those of the reproducing devices of the above-described embodiments. The devices of FIGS. 43 and 44 are the same as those of the above-described embodiments with a difference in that a half mirror 154 and an optical beam shaping element (collimator lens) 155 are provided, for which devices no detailed description will be made.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of reproducing a plurality of information multiplex-recorded at the same recording portion of an optical recording medium which has at least two different recording materials which are respectively responsive to different frequencies of light, comprising the steps of:
    irradiating said optical recording medium with a reading optical beam composed of at least two different frequencies of light to cause an interaction between said reading optical beam and said optical recording medium,
    receiving and separating said reading optical beam after it interacts with said optical recording medium into a plurality of reading optical beams which together contain said plurality of information through said interaction, each of said plurality of reading optical beams containing main information and cross-talk information, said cross-talk information corresponding to information contained by at least one other one of said plurality of reading optical beams,
    converting each of said plurality of reading optical beams respectively into a plurality of electric reproduced signals,
    means for estimating a cross-talk noise component in a given one of said plurality of reproducing signals based on at least one of the other remaining reproduced signals; and subtracting, from a given one of said plurality of reproducing signals, said cross-talk noise component estimated based on said at least one of the other remaining reproduced signals.

2. The method according to claim 1, wherein each said frequency of light corresponds to only a respective predetermined portion of said plurality of information which includes multiplex-recorded data.

3. The method according to claim 2, wherein each said frequency of light is at least partly absorbed by said optical recording medium depending on the respective predetermined portion of said plurality of information.

4. A method of reproducing information recorded on an optical recording medium by optical anisotrophy caused by a writing optical beam, comprising the steps of:
   irradiating said optical recording medium with a reading optical beam having two orthogonally intersecting components of linear polarization allowing detection of the optical anisotrophy,
   separating said reading optical beam interacting with said optical recording medium into first and second reading optical beams having polarization components different from each other,
   detecting said first and second reading optical beams and producing respective first and second output signals, and
   subtracting said first and second output signals to obtain a difference, thereby obtaining an improved reproduced output signal.

5. The method according to claim 4, wherein said writing optical beam includes a linearly polarized light beam.

6. The method according to claim 5, wherein before said step of irradiating said optical recording medium, said information is recorded on said optical recording medium by changing a polarization angle of said writing optical beam.

7. The method according to claim 6, wherein in said step of irradiating said optical recording medium, said reading optical beam includes a circularly polarized light.

8. The method according to claim 6, wherein in said step of irradiating said optical recording medium, said reading optical beam includes two linearly polarized light beams having polarization angles which are different from each other.

9. A method of reading an information signal recorded on an optical recording medium, comprising the steps of:
   separating an optical beam emitted from a light source into first and second optical beams,
   irradiating said recording medium with said first optical beam to obtain a first electric output signal corresponding to a read information signal from said first optical beam,
   obtaining a second electric output signal corresponding to a read information signal from said second optical beam, and
   carrying out a non-linear operation including a product of read-out signals, between said first output signal and said second output signal.

10. A method of reproducing information recorded on an optical recording medium, comprising the steps of:
    directing a first optical beam capable of reading a predetermined portion of said information and a second optical beam capable of reading another portion of said information at the same recording portion on said optical recording medium and being substantially incapable of reading said predetermined portion of said information read by said first optical beam at the same recording portion on said optical recording medium; wherein said first optical beam, after reading said predetermined portion of said information, contains a cross-talk component which is estimated from information read at the same recording portion on said optical recording medium by said second optical beam,
    obtaining a first electric output signal corresponding to said first beam interacting with said optical recording medium,
    obtaining a second electric output signal corresponding to said second beam interacting with said optical recording medium, said second electric output signal corresponding generally to said cross-talk component in said first electric output signal, and
    subtracting said second output signal from said first output signal, thereby obtaining a reproduced output signal with a reduced medium source noise.

11. A method of reproducing information recorded on an optical recording medium, comprising the steps of:
    directing a first optical beam capable of reading a predetermined portion of said information and a second optical beam capable of reading another portion of said information at the same recording portion on said optical recording medium and being substantially incapable of reading said predetermined portion of said information read by said first optical beam at the same recording portion on said optical recording medium; wherein said first optical beam, after reading said predetermined portion of said information, contains a cross-talk component which is estimated from information read at the same recording portion on said optical recording medium by said second optical beam,
    obtaining a first output signal corresponding to said first beam interacting with said optical recording medium,
    obtaining a second output signal corresponding to said second beam interacting with said optical recording medium; said first electric output signal containing a cross-talk component which corresponds generally to a read information signal from said second electric output signal, and
    performing a non-linear operation including a product of read-out signals on one of said first output signal and said second output signal and performing a linear operation using said first output signal and said second output signal, thereby obtaining a reproduced output signal with a reduced medium source noise.

12. The method according to claim 11, wherein said non-linear operation includes multiplication and said linear operation includes subtraction.

13. A method of reading information recorded on an optical recording medium, comprising the steps of:
    directing a plurality of optical beams onto the same recording track on said optical recording medium, said plurality of optical beams having different frequencies of light;
    obtaining a plurality of electric detected signals corresponding respectively to each of said plurality of optical beams which are received after interacting with said optical recording medium, storing each of said plurality of electric detected signals in a memory means together with a synchronization signal, simultaneously reading said plurality of detected signals and synchronizing said plurality of detected signals using said synchronization signal, and performing a predetermined operation including at least a difference on at least one of said plurality of electric detected signals by using at least another one of the read said plurality of electric detected signals, to obtain a reproduced output signal with reduced medium source noise and cross-talk component.

14. A method of reproducing information recorded on an optical recording medium, comprising the steps of:

directing a plurality of optical beams having different frequencies onto the same recording track on said optical recording medium, obtaining a plurality of electric detected signals corresponding respectively to each of said plurality of optical beams which are received after interacting with said optical recording medium, compensating for a delay time depending on a distance between recording spots on said recording track and a moving speed of said spots in order to cause phases of said plurality of detected signals to coincide with each other, and performing a predetermined operation including at least a difference on at least one of said plurality of electric detected signals by using another one of said plurality of detected signals, in order to obtain a reproduced output signal with reduced medium source noise and cross-talk component.

15. A method of reproducing information recorded on an optical recording medium by birefringence generated by a writing optical beam, comprising the steps of:

irradiating said optical recording medium with a first linearly polarized beam having a polarizing surface not coincident with a neutral axis orientation of said birefringence and a second linearly polarized beam having a polarizing surface coincident with the neutral axis orientation of said birefringence, subtracting first and second electric output signals obtained respectively by detecting said first and second beams interacting with said optical recording medium to obtain a difference, thereby obtaining an improved reproduced output signal.

16. The method according to claim 15, wherein said optical recording medium includes a photochromic material, and said first and second linearly polarized beams are light beams having wavelengths which do not cause light absorption of the photochromic material.

17. A method of reproducing information recording on an optical recording medium by rotatory polarization generated by a writing optical beam, comprising the steps of:

irradiating said optical recording medium with a first reading beam in a state of linear polarization and a second reading beam in a state of circular polarization, subtracting first and second electric output signals obtained respectively by detecting said first and second reading beams interacting with said optical recording medium to obtain a difference, thereby obtaining an improved reproduced output signal.

18. The method according to claim 17, wherein said optical recording medium includes a photochromic material, and said first and second reading beams are light beams having wavelength which do not generate light absorption of the photochromic material.

* * * * *